(12) United States Patent
Coyote et al.

(10) Patent No.: US 9,495,468 B2
(45) Date of Patent: Nov. 15, 2016

(54) METHODS AND SYSTEMS FOR AGGREGATING AND PRESENTING LARGE DATA SETS

(71) Applicants: Michael Edward Coyote, Seattle, WA (US); Matthew Greene, Seattle, WA (US); Marcellino Tanumihardja, Seattle, WA (US); Mei Chi Chin, Seattle, WA (US)

(72) Inventors: Michael Edward Coyote, Seattle, WA (US); Matthew Greene, Seattle, WA (US); Marcellino Tanumihardja, Seattle, WA (US); Mei Chi Chin, Seattle, WA (US)

(73) Assignee: VULCAN TECHNOLOGIES, LLC, Seattle, WA (US)

( * ) Notice: Subject to any disclaimer, the term of this patent is extended or adjusted under 35 U.S.C. 154(b) by 339 days.

(21) Appl. No.: 14/207,455

(22) Filed: Mar. 12, 2014

(65) Prior Publication Data
US 2014/0337321 A1 Nov. 13, 2014

Related U.S. Application Data

(60) Provisional application No. 61/777,802, filed on Mar. 12, 2013.

(51) Int. Cl.
| | | |
|---|---|---|
| G06F 17/30 | (2006.01) | |
| G06F 7/00 | (2006.01) | |
| G06F 3/0484 | (2013.01) | |
| G06F 3/0482 | (2013.01) | |

(52) U.S. Cl.
CPC ....... *G06F 17/30873* (2013.01); *G06F 3/0482* (2013.01); *G06F 3/04842* (2013.01)

(58) Field of Classification Search
CPC .................. G06F 17/30554; G06F 17/30867; G06F 17/30864; G06F 17/30598; G06F 17/30395; G06F 17/30958; G06F 17/30011; G06F 17/30389; G06F 17/30657; G06F 17/2247; G06F 3/0482; G06F 3/04842
See application file for complete search history.

(56) References Cited

U.S. PATENT DOCUMENTS

| | | | |
|---|---|---|---|
| 6,448,987 B1 | 9/2002 | Easty et al. | |
| 8,028,250 B2 * | 9/2011 | Vronay ................ | G06F 3/0482 715/764 |
| 2003/0004961 A1 * | 1/2003 | Slothouber ............ | G06F 9/445 |
| 2004/0128699 A1 * | 7/2004 | Delpuch ............... | H04N 7/165 725/120 |
| 2010/0058248 A1 * | 3/2010 | Park ..................... | G06F 3/0481 715/851 |
| 2010/0226366 A1 * | 9/2010 | Lee ...................... | H04H 40/18 370/389 |
| 2014/0059497 A1 * | 2/2014 | Burckart .............. | G06F 3/0482 715/854 |

FOREIGN PATENT DOCUMENTS

EP 1471744 A1 10/2004

\* cited by examiner

*Primary Examiner* — Dung K Chau
(74) *Attorney, Agent, or Firm* — Olympic Patent Works PLLC

(57) ABSTRACT

The current document is directed to methods and systems that aggregate data from multiple sources and that organize and efficiently present data obtained from the data sources to a user on a user, or client, device. In certain implementations, a client-side application communicates with one or more servers of a cloud-based data-aggregation system. A multi-rotor-data-carousel-based graphical user interface accommodates data items continuously received from the data-aggregation system and efficiently displays portions of the data items to the user.

18 Claims, 24 Drawing Sheets

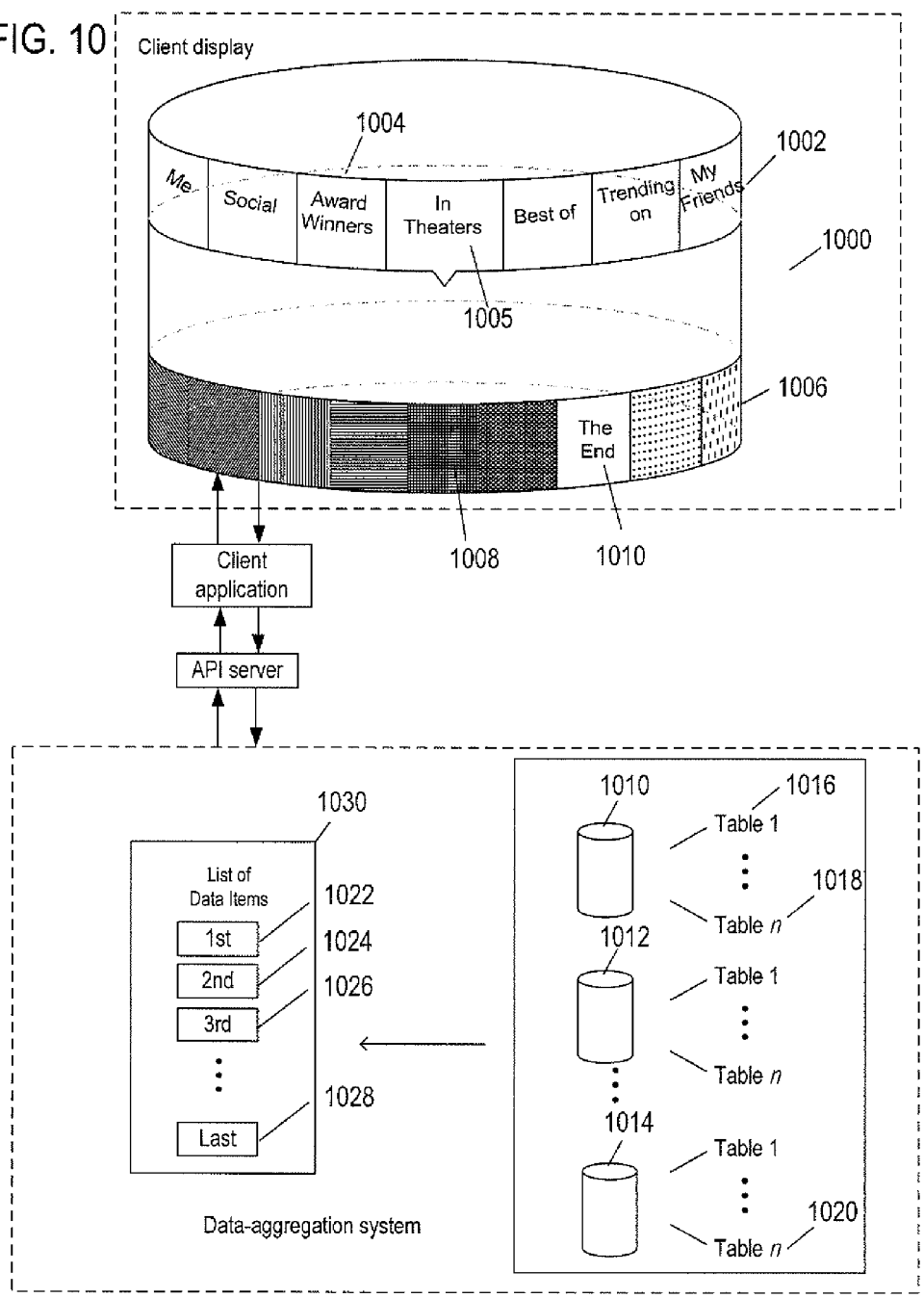

ID
METHODS AND SYSTEMS FOR AGGREGATING AND PRESENTING LARGE DATA SETS

CROSS-REFERENCE TO RELATED APPLICATION

This application claims the benefit of Provisional Application No. 61/777,802, filed Mar. 12, 2013.

TECHNICAL FIELD

The current document is directed to data aggregation and visualization, and, in particular, to methods and systems for aggregating and presenting large data sets.

BACKGROUND

The ongoing evolution of computer processors, data-storage devices, and networking technologies has revolutionized many aspects of modern life and has led to the creation and development of many new industries and businesses, including distribution of multi-media content and software, social-networking services, and Internet retailing of goods. Large, cloud-based computational systems can aggregate and provide access to massive amounts of information from many different sources. The cloud-based computational systems may provide requested information items from the aggregated information to users that access the information via a variety of different types of user devices. The user devices generally execute applications that provide graphical user interfaces ("GUIs") through which users interact with the applications and which display information obtained from cloud-based information services to the users. The number of displayed items and the types and sizes of renderings that can be displayed are often limited by available screen space, which can be particularly problematic for mobile computing implementations. Designers, developers, and vendors of applications and information-distribution services continue to seek new approaches to organizing and presenting information to users through graphical user interfaces.

SUMMARY

The current document is directed to methods and systems that aggregate data from multiple sources and that organize and efficiently present data obtained from the data sources to a user on a user, or client, device. In certain implementations, a client-side application communicates with one or more servers of a cloud-based data-aggregation system. A multi-rotor-data-carousel-based graphical user interface accommodates data items continuously received from the data-aggregation system and efficiently displays portions of the data items to the user.

BRIEF DESCRIPTION OF THE DRAWING

FIG. 10 shows a carousel-display panel in a multi-rotor, data-carousel-based GUI containing a top-level topic rotor and a result rotor.

DETAILED DESCRIPTION

The current document is directed to methods and systems for retrieving and aggregating large sets of data from a remote server system and presenting them to a user through a multi-rotor data-carousel-based interface. In a first subsection, computer architecture and cloud-based services are introduced. In a second subsection, electronic communication between a client and server is described. In a third subsection, a method and system for retrieving and gathering data content from a data-aggregation network is described. In a fourth subsection, one implementation of the multi-rotor, data-carousel-based interface is provided.

It should be noted, at the onset, that method and system implementations are not restricted to a particular class or type of application programs or web sites, but are generally applicable to a wide variety of different types of application programs, web sites, and web-site-based businesses and organizations. For example, implementations can be applied to application programs that compile media content, including movies, TV shows, music, books, and games, but can also be applied to web sites or mobile applications for Internet-commerce, to social-networking web sites and application programs, to search-engine service providers, and many other types of application programs, web sites, and web-site-based business. It should also be noted, at the onset, that the currently disclosed methods and systems are directed to real, tangible, physical systems and methods carried out within physical systems, including client computers and server computers. Those familiar with modem science and technology well appreciate that, in modem computer systems and other processor-controlled devices and systems, the control components are often fully or partially implemented as sequences of computer instructions that are stored in one or more electronic memories and, in many cases, also in one or more mass-storage devices, and which are executed by one or more processors. As a result of execution of the computer instructions, a processor-controlled device or system carries out various operations, generally at many different levels within the device or system, according to control logic implemented in the stored and executed computer instructions. Computer-instruction-implemented control components of modern processor-controlled devices and systems are as tangible and physical as any other component of the system, including power supplies, cooling fans, electronic memories and processors, and other such physical components.

Computer Architecture and Cloud-Based Services

Figure 1:
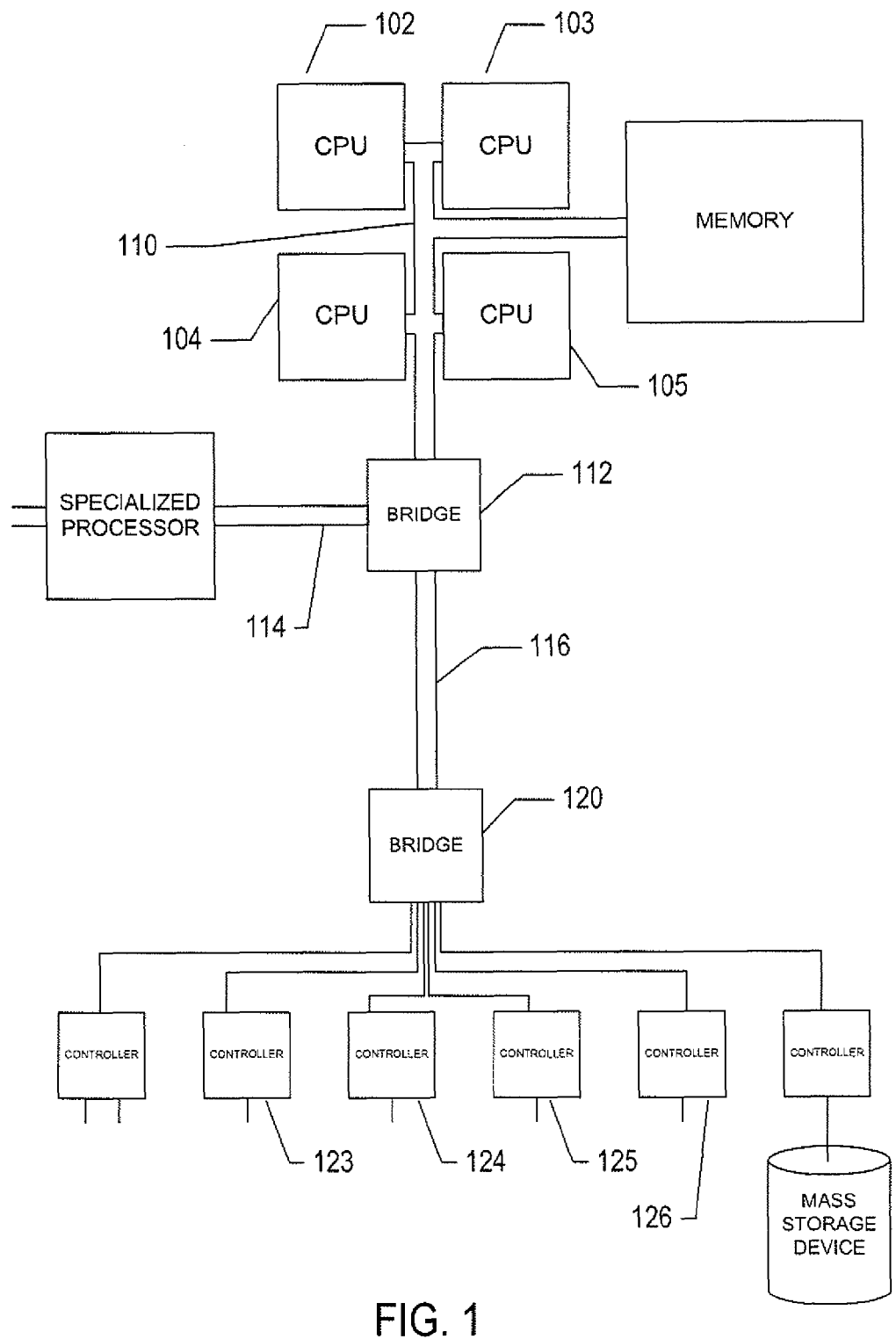
FIG. 1 provides a general architectural diagram for various types of computers and other processor-controlled devices.

FIG. 1 provides a general architectural diagram for various types of computers and other processor-controlled devices. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. The busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of computer-readable media, such as computer-readable medium 128, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 128 is a data-storage device, including electronic memory, optical or magnetic disk drive, USB drive, flash memory and other such data-storage device. The computer-readable medium 128 can be used to store machine-readable instructions that encode the computational methods described below and can be used to store encoded data, during store operations, and from which encoded data can be retrieved, during read operations, by computer systems, data-storage systems, and peripheral device.

Of course, there are many different types of computer-system architectures that differ from one another in the number and types of different memories employed, including different types of hierarchical cache memories, the number and types of processors and the connectivity of the processors with other system components, the number and types of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
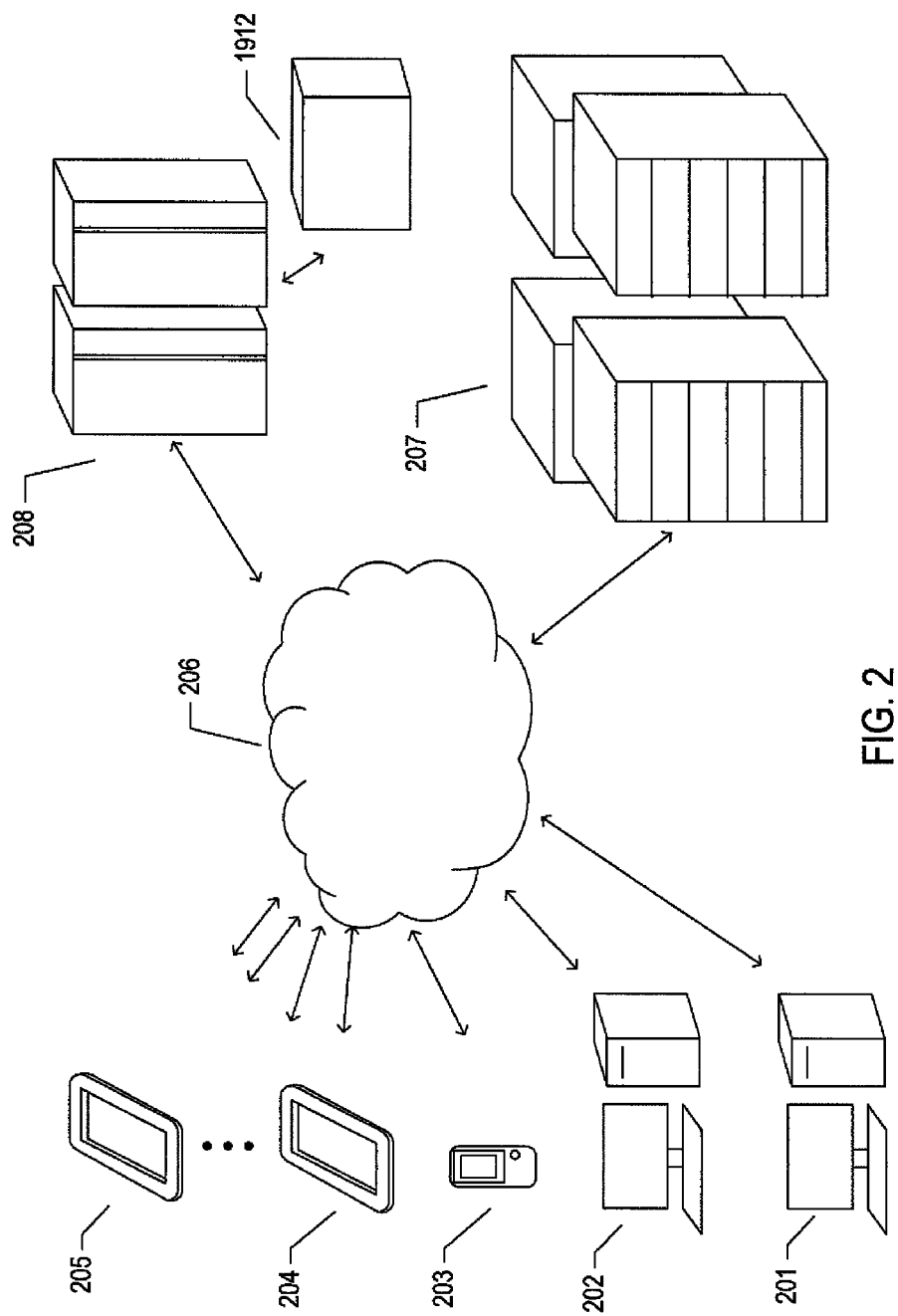
FIG. 2 illustrates generalized hardware and software components of a general-purpose computer system.

FIG. 2 illustrated an Internet-connected distributed computer environment in which the current methods are systems are conducted. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a distributed system in which a variety of different types of user devices, including PCs, electronic tablets, smart phones, and other such processor-controlled electronic devices, a high-end distributed mainframe system with a large data-storage system, and a large computer center all interconnected through various communications and networking systems that together comprise the Internet 216. The large computer center may include a large number of server computers, a variety of different types of computer systems interconnected with local and wide-area networks, or server computers and other types of computers of a public or private cloud-computing facility that provide virtual servers and other virtual systems. Such distributed computing systems provide diverse arrays of functionalities. The physical servers hosted in the remote computer system process large numbers of requests from the large number of users, also known as "clients," executing application programs, operating systems, and virtual machine monitors. There are many types of servers that provide different services to client computers, including web servers, file servers, and database servers. For example, a PC user or a tablet user may remotely access hundreds of millions of different web sites provided by hundreds of thousands of different web servers throughout the world and may access the data stored in one or more remote database servers. In certain cases, the collection of data and the analysis of the collected data may be carried out within the same remote computer system that serves web pages to users. In other cases, a separate network system may carry out a portion of the data storage and analysis.

Figure 3:
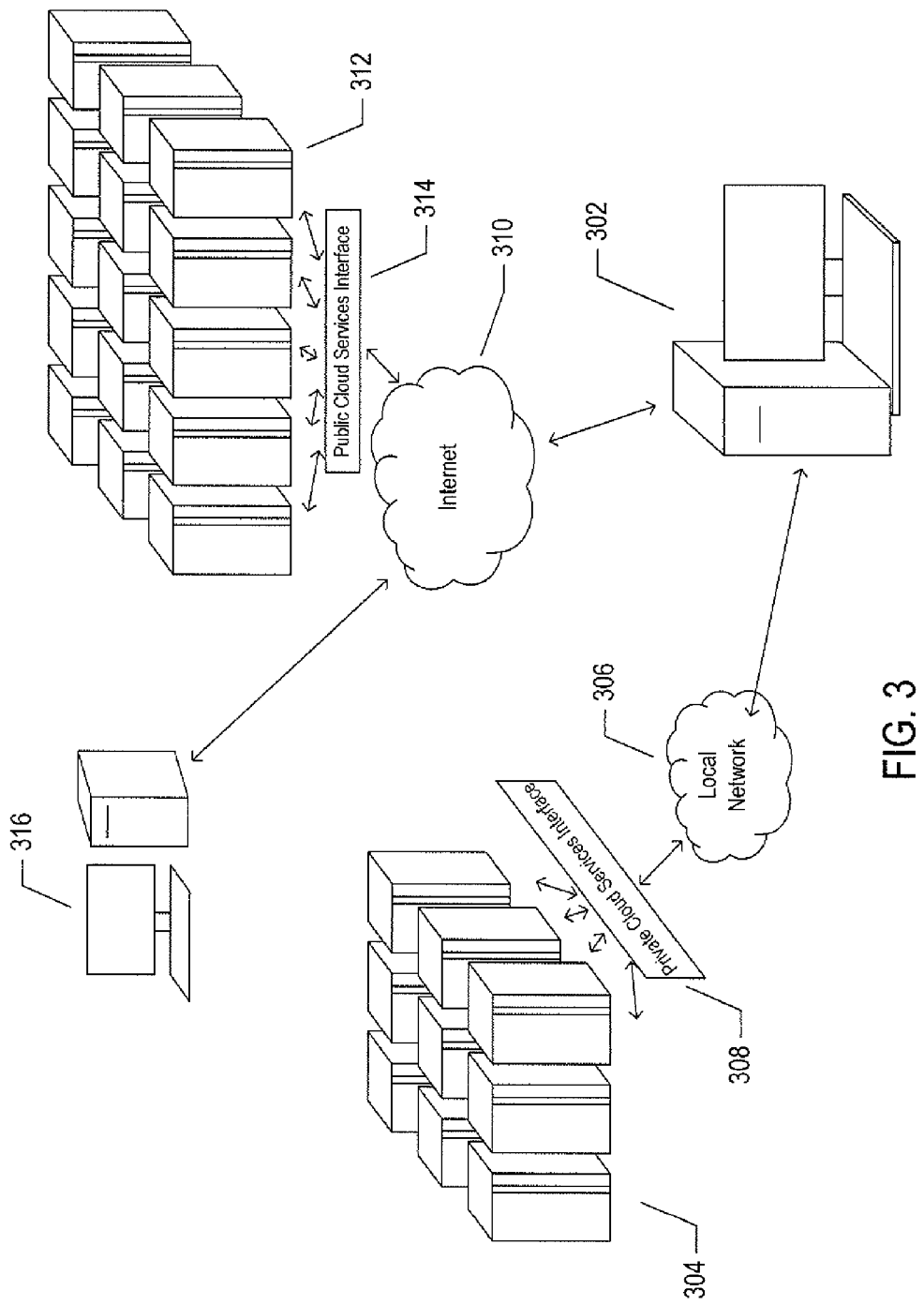
FIG. 3 illustrates generalized hardware and software components of a general-purpose computer system that includes a virtualization layer.

FIG. 3 illustrates cloud computing. In the recently developed cloud-computing paradigm, computing cycles and data-storage facilities are provided to organizations and individuals by cloud-computing providers. Larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Figure 4:
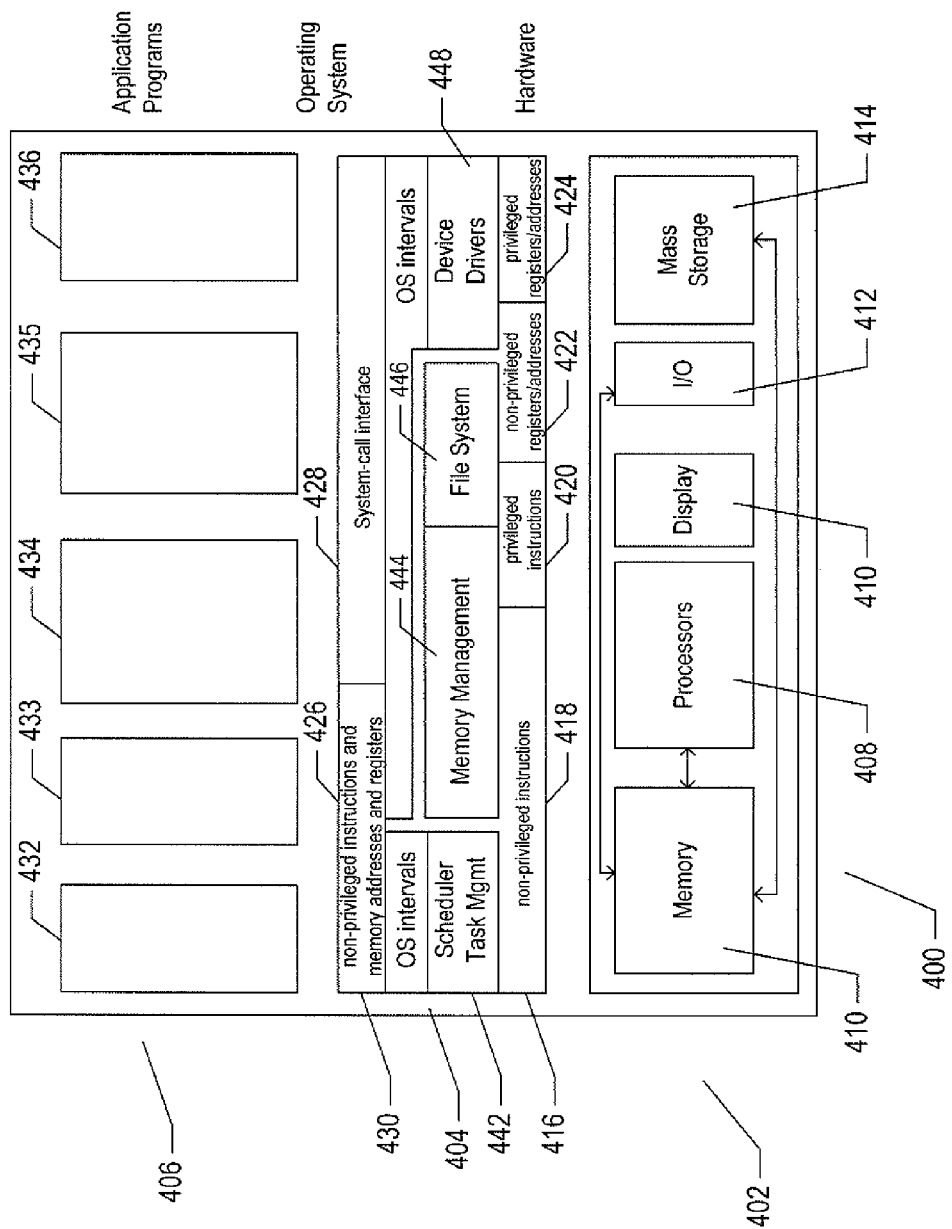
FIG. 4 illustrates an Internet-connected distributed computer system.

FIG. 4 illustrates generalized hardware and software components of a general-purpose computer system. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") device 412, and mass-storage devices 414. The I/O device may comprise a keyboard, a mouse, touch pad, or other pointing device. The hard ware layer 402 may also include a display device 410 that may comprise any feasible means for generating an image for display. In some implementations, the display device may be a touch screen, which also acts as an I/O device. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application is programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules.

Figure 5:
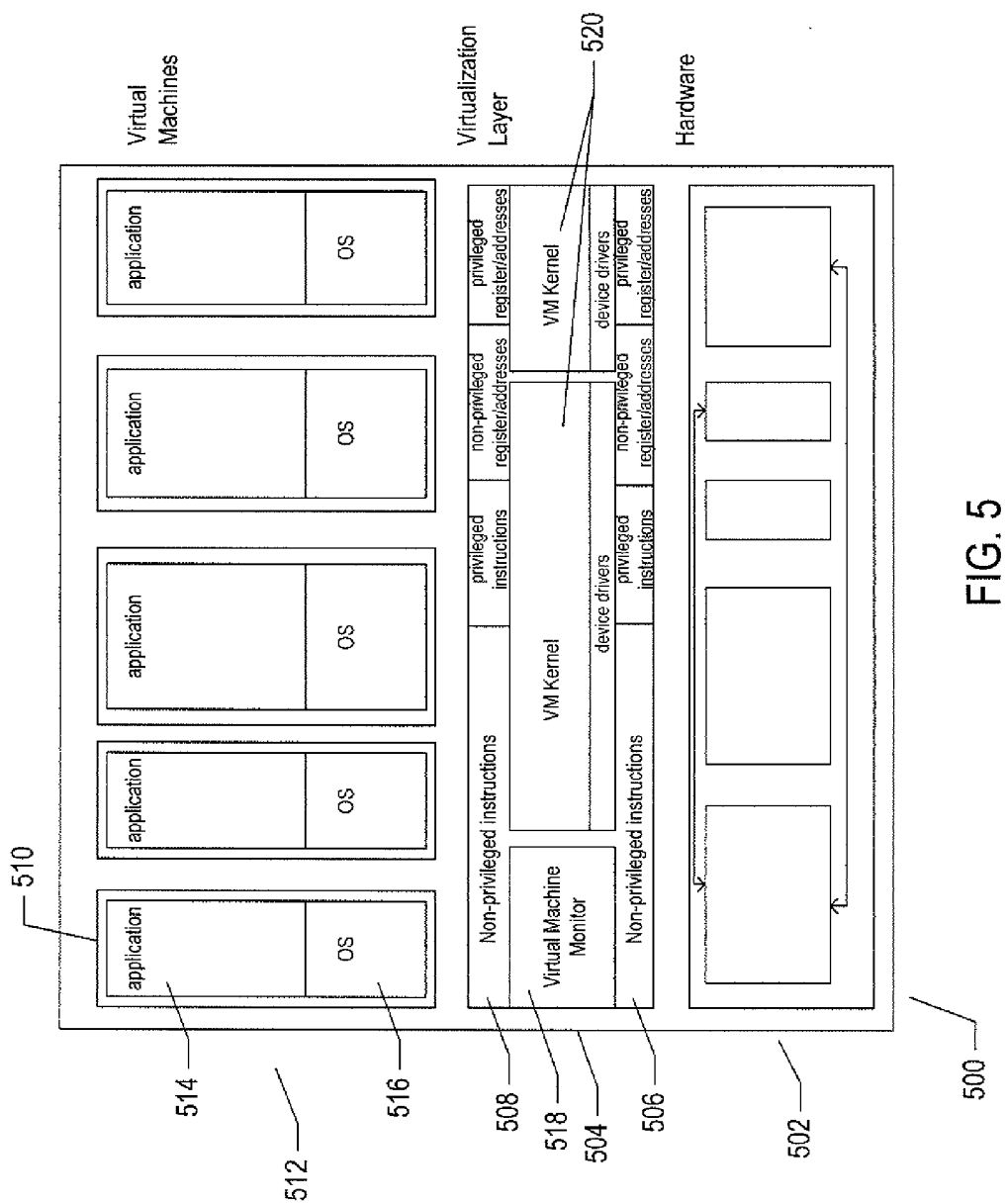
FIG. 5 illustrates cloud computing.

FIG. 5 illustrates generalized hardware and software components of a general-purpose computer system that includes a virtualization layer. FIG. 5 uses the same illustration conventions as used in FIG. 4. In particular, the computer system 500 in FIG. 5 includes the same hardware layer 502 as the hardware layer 402 shown in FIG. 4. However, rather than providing an operating system layer directly above the hardware layer, as in FIG. 4, the virtualized computing environment illustrated in FIG. 5 features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, such as application 514 and operating system 516 packaged together within virtual machine 510. Each virtual machine is thus equivalent to the operating-system layer 404 and application-program layer 406 in the general-purpose computer system shown in FIG. 4. Each operating system within a virtual machine interfaces to the virtualization-layer interface 508 rather than to the actual hardware interface 506. The virtualization layer partitions hardware resources into abstract virtual-hardware layers to which each operating system within a virtual machine interfaces. The operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different operating systems. For example, the virtualization layer is generally able to provide virtual hardware interfaces for a variety of different types of computer hardware. This allows, as one example, a virtual machine that includes an operating system designed for a particular computer architecture to run on hardware of a different architecture. The number of virtual machines need not be equal to the number of physical processors or even a multiple of the number of processors. The virtualization layer includes a virtual-machine-monitor module 518 that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the operating system within a virtual machine accesses virtual privileged instructions, virtual privileged registers, and virtual privileged memory through the virtualization-layer interface 508, the accesses may result in execution of virtualization-layer code to simulate or emulate the privileged resources. The virtualization layer additionally includes a kernel module 520 that manages memory, communications, and data-storage machine resources on behalf of executing virtual machines. The kernel, for example, may maintain shadow page tables on each virtual machine so that hardware-level virtual-memory facilities can be used to process memory accesses. The kernel may additionally include routines that implement virtual communications and data-storage devices as well as device drivers that directly control the operation of underlying hardware communications and data-storage devices. Similarly, the kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

Electronic Communication Between a Client and Server

Figure 6:
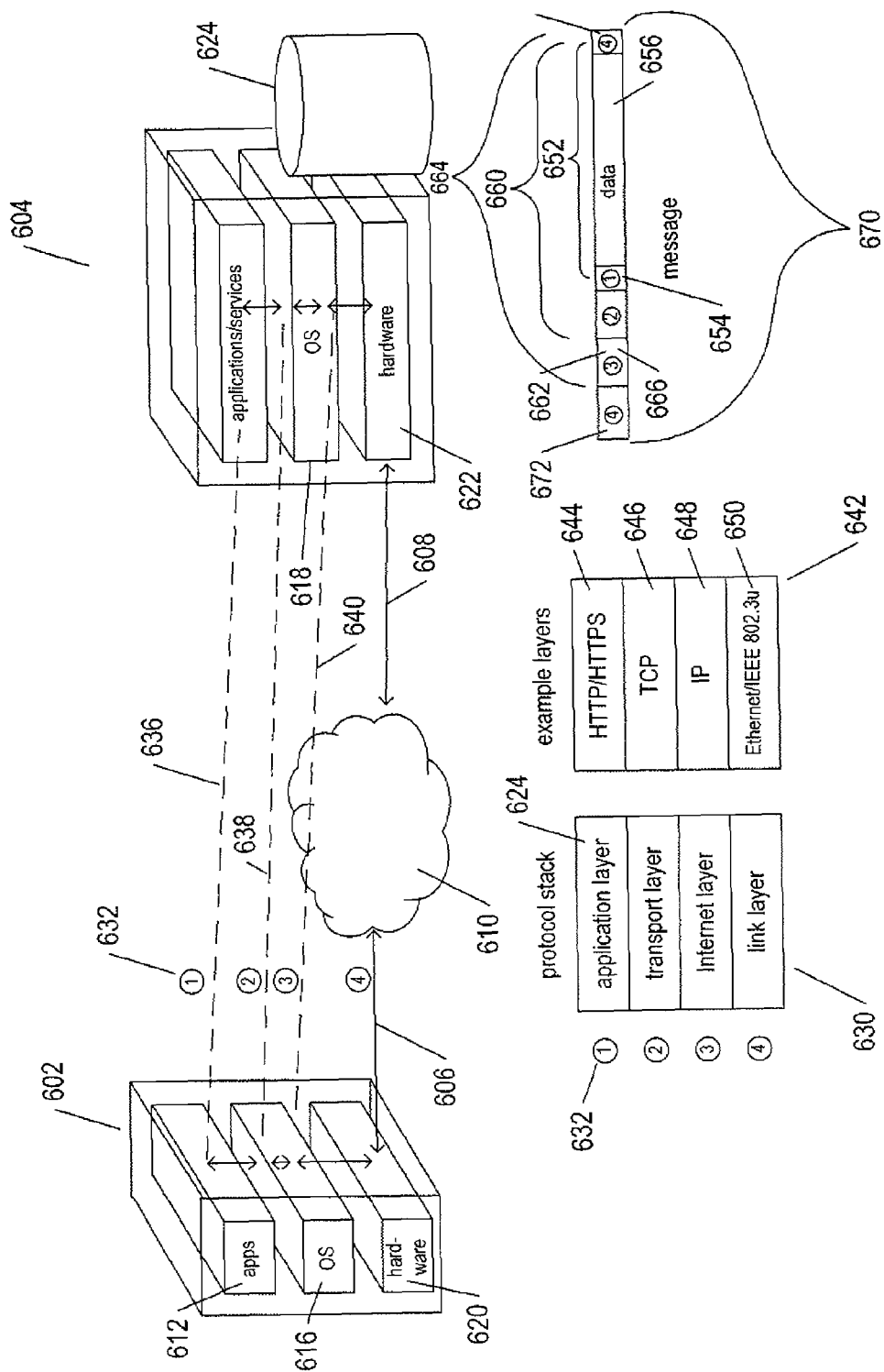
FIG. 6 illustrates electronic communications between a client and server computer.

FIG. 6 illustrates electronic communications between a client and server computer. In FIG. 6, a client computer 602 is shown to be interconnected with a server computer 604 via local communication links 606 and 608 and a complex distributed intermediary communications system 610, such as the Internet. This complex communications system may include a large number of individual computer systems and many types of electronic communications media, including wide-area networks, public switched telephone networks, wireless communications, satellite communications, and many other types of electronics-communications systems and intermediate computer systems, routers, bridges, and other device and system components. Both the server and client computers are shown to include three basic internal layers including an applications layer 612 in the client computer and a corresponding applications and services layer 614 in the server computer, an operating-system layer 616 and 618, and a hardware layer 620 and 622. The server computer 604 is additionally associated with an internal, peripheral, or remote data-storage subsystem 624. The hardware layers 620 and 622 may include the components discussed above with reference to FIG. 1 as well as many additional hardware components and subsystems, such as power supplies, cooling fans, switches, auxiliary processors, and many other mechanical, electrical, electromechanical, and electro-optical-mechanical components. The operating system 616 and 618 represents the general control system of both a client computer 602 and a server computer 604. The operating system interfaces to the hardware layer through a set of registers that, under processor control, are used for transferring data, including commands and stored information, between the operating system and various hardware components. The operating system also provides a complex execution environment in which various application programs, including database management systems, web browsers, web services, and other application programs execute. In many cases, modern computer systems employ an additional layer between the operating system and the hardware layer, referred to as a "virtualization layer," that interacts directly with the hardware and provides a virtual-hardware-execution environment for one or more operating systems.

Client systems may include any of many types of processor-controlled devices, including tablet computers, laptop computers, mobile smart phones, and other such processor-controlled devices. These various types of clients may include only a subset of the components included in a desktop personal component as well components not generally included in desktop personal computers.

Electronic communications between computer systems generally comprises packets of information, referred to as datagrams, transferred from client computers to server computers and from server computers to client computers. In many cases, the communications between computer systems is commonly viewed from the relatively high level of an application program which uses an application-layer protocol for information transfer. However, the application-layer protocol is implemented on top of additional layers, including a transport layer, Internet layer, and link layer. These layers are commonly implemented at different levels within computer systems. Each layer is associated with a protocol for data transfer between corresponding layers of computer systems. These layers of protocols are commonly referred to as a "protocol stack." In FIG. 6, a representation of a common protocol stack 630 is shown below the interconnected server and client computers 604 and 602. The layers are associated with layer numbers, such as layer number "1" 632 associated with the application layer 634. These same layer numbers are used in the depiction of the interconnection of the client computer 602 with the server computer 604, such as layer number "1" 632 associated with a horizontal dashed line 636 that represents interconnection of the application layer 612 of the client computer with the applications/services layer 614 of the server computer through an application-layer protocol. A dashed line 636 represents interconnection via the application-layer protocol in FIG. 6, because this interconnection is logical, rather than physical. Dashed-line 638 represents the logical interconnection of the operating-system layers of the client and server computers via a transport layer. Dashed line 640 represents the logical interconnection of the operating systems of the two computer systems via an Internet-layer protocol. Finally, links 606 and 608 and cloud 610 together represent the physical communications media and components that physically transfer data from the client computer to the server computer and from the server computer to the client computer. These physical communications components and media transfer data according to a link-layer protocol. In FIG. 6, a second table 642 aligned with the table 630 that illustrates the protocol stack includes example protocols that may be used for each of the different protocol layers. The hypertext transfer protocol ("HTTP") or hypertext transfer protocol secure may be used as the application-layer protocol 644, the transmission control protocol ("TCP") 646 may be used as the transport-layer protocol, the Internet protocol 648 ("IP") may be used as the Internet-layer protocol, and, in the case of a computer system interconnected through a local Ethernet to the Internet, the Ethernet/IEEE 802.3u protocol 650 may be used for transmitting and receiving information from the computer system to the complex communications components of the Internet. Within cloud 610, which represents the Internet, many additional types of protocols may be used for transferring the data between the client computer and server computer.

Consider sending of a message, via the HTTP protocol, from the client computer to the server computer. An application program generally makes a system call to the operating system and includes, in the system call, an indication of the recipient to whom the data is to be sent as well as a reference to a buffer that contains the data. The data and other information are packaged together into one or more HTTP datagrams, such as datagram 652. The datagram may generally include a header 654 as well as the data 656, encoded as a sequence of bytes within a block of memory. The header 654 is generally a record composed of multiple byte-encoded fields. The call by the application program to an application-layer system call is represented in FIG. 6 by solid vertical arrow 658. The operating system employs a transport-layer protocol, such as TCP, to transfer one or more application-layer datagrams that together represent an application-layer message. In general, when the application-layer message exceeds some threshold number of bytes, the message is sent as two or more transport-layer messages. Each of the transport-layer messages 660 includes a transport-layer-message header 662 and an application-layer datagram 652. The transport-layer header includes, among other things, sequence numbers that allow a series of application-layer datagrams to be reassembled into a single application-layer message. The transport-layer protocol is responsible for end-to-end message transfer independent of the underlying network and other communications subsystems, and is additionally concerned with error control, segmentation, as discussed above, flow control, congestion control, application addressing, and other aspects of reliable end-to-end message transfer. The transport-layer datagrams are then forwarded to the Internet layer via system calls within the operating system and are embedded within Internet-layer datagrams 664, each including an Internet-layer header 666 and a transport-layer datagram. The Internet layer of the protocol stack is concerned with sending datagrams across the potentially many different communications media and subsystems that together comprise the Internet. This involves routing of messages through the complex communications systems to the intended destination. The Internet layer is concerned with assigning unique addresses, known as "IP addresses," to both the sending computer and the destination computer for a message and routing the message through the Internet to the destination computer. Internet-layer datagrams are finally transferred, by the operating system, to communications hardware, such as a network-interface controller ("NIC") which embeds the Internet-layer datagram 664 into a link-layer datagram 670 that includes a link-layer header 672 and generally includes a number of additional bytes 674 appended to the end of the Internet-layer datagram. The link-layer header includes collision-control and error-control information as well as local-network addresses. The link-layer packet or datagram 670 is a sequence of bytes that includes information introduced by each of the layers of the protocol stack as well as the actual data that is transferred from the source computer to the destination computer according to the application-layer protocol.

Figure 7:
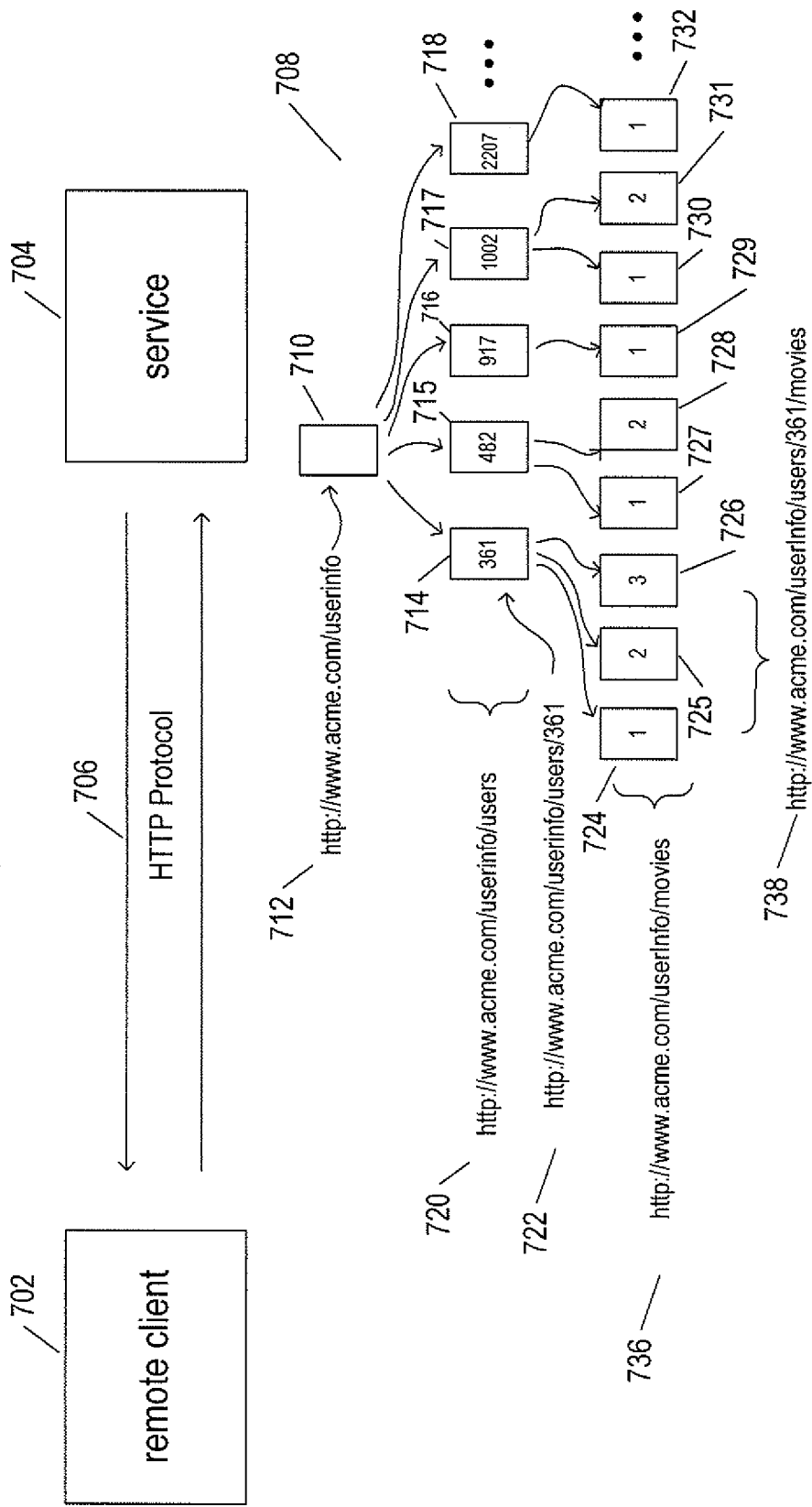
FIG. 7 illustrates the role of resources in RESTful APIs.

Next, the RESTful approach to web-service APIs is described, beginning with FIG. 7. FIG. 7 illustrates the role of resources in RESTful APIs. In FIG. 7, and in subsequent figures, a remote client 702 is shown to be interconnected and communicating with a service provided by one or more service computers 704 via the HTTP protocol 706. Many RESTful APIs are based on the HTTP protocol. Thus, the focus is on the application layer in the following discussion. However, as discussed above with reference to FIG. 21, the remote client 702 and service provided by one or more server computers 704 are, in fact, physical systems with application, operating-system, and hardware layers that are interconnected with various types of communications media and communications subsystems, with the HTTP protocol the highest-level layer in a protocol stack implemented in the application, operating-system, and hardware layers of client computers and server computers. The service may be provided by one or more server computers, as discussed above in a preceding section. As one example, a number of servers may be hierarchically organized as various levels of intermediary servers and end-point servers. However, the entire collection of servers that together provide a service is addressed by a domain name included in a uniform resource identifier ("URI"), as further discussed below. A RESTful API is based on a small set of verbs, or operations, provided by the HTTP protocol and on resources, each uniquely identified by a corresponding URI. Resources are logical entities, information about which is stored on one or more servers that together comprise a domain. URIs are the unique names for resources. A resource about which information is stored on a server that is connected to the Internet has a unique URI that allows that information to be accessed by any client computer also connected to the Internet with proper authorization and privileges. URIs are thus globally unique identifiers, and can be used to specify resources on server computers throughout the world. A resource may be any logical entity, including people, digitally encoded documents, organizations, services, routines, and other such entities that can be described and characterized by digitally encoded information. Digitally encoded information that describes the resource and that can be accessed by a client computer from a server computer is referred to as a "representation" of the corresponding resource. As one example, when a resource is a web page, the representation of the resource may be a hypertext markup language ("HTML") encoding of the resource. As another example, when the resource is a list of movie items, the representation of the resource may be one or more records, each containing one or more fields that store a media metadata charactering the movie, such as the movie's name, cast members, director, a synopsis of the movie, and other such information.

In the example shown in FIG. 7, the web servers 704 provides a RESTful API based on the HTTP protocol 706 and a hierarchically organized set of resources 708 that allow clients of the service to access information about the users and movies watched by users of the Acme Company. This service may be provided by the Acme Company itself or by a third-party information provider. All of the user and movie information is collectively represented by a user information resource 710 associated with the URI "http://www.acme.com/userInfo" 712. As discussed further, below, this single URI and the HTTP protocol together provide sufficient information for a remote client computer to access any of the particular types of user and movie information stored and distributed by the service 704. A user information resource 710 represents a large number of subordinate resources. These subordinate resources include, for each of the users of the Acme Company, a user resource, such as user resource 714. All of the user resources 714-718 are collectively named or specified by the single URI "http://www.acme.com/userInfo/users" 720. Individual user resources, such as user resource 714, are associated with user-identifier numbers and are each separately addressable by user-resource-specific URIs, such as URI "http://www.acme.com/userInfo/users/361" 722 which includes the user identifier "361" for the user represented by user resource 714. Each user may be logically associated with one or more movies. For example, the user represented by user resource 714 is associated with three different movies 724-726, each represented by a movie resource. All of the movie are collectively specified or named by a single URI "http://www.acme.com/userInfo/movies" 736. All of the movies associated with the user represented by resource 714, movies represented by movie resources 724-726, can be collectively specified by the URI "http://www.acme.com/userInfo/users/361/movies" 738. A particular movie, such as the movie represented by movie resource 724, may be specified by a unique URI associated with that movie, such as URI "http://www.acme.com/userInfo/users/361/movies/1", where the final "1" is an movie number that specifies a particular movie within the set of movies corresponding to the particular user identified by the user identifier "361."

In one sense, the URIs bear similarity to path names to files in file directories provided by computer operating systems. However, it should be appreciated that resources, unlike files, are logical entities rather than physical entities, such as the set of stored bytes that together compose a file within a computer system. When a file is accessed through a path name, a copy of a sequence of bytes that are stored in a memory or mass-storage device as a portion of that file are transferred to an accessing entity. By contrast, when a resource is accessed through a URI, a server computer returns a digitally encoded representation of the resource, rather than a copy of the resource. For example, when the resource is a human being, the service accessed via a URI specifying the human being may return alphanumeric encodings of various characteristics of the human being, a digitally encoded photograph or photographs, and other such information. Unlike the case of a file accessed through a path name, the representation of a resource is not a copy of the resource, but is instead some type of digitally encoded information with respect to the resource.

In the example RESTful API illustrated in FIG. 7, a client computer can use the verbs, or operations, of the HTTP protocol and the top-level URI 712 to navigate the entire hierarchy of resources 708 in order to obtain and post information. FIGS. 8A-D illustrate four basic verbs, or operations, provided by the HTTP application-layer protocol used in RESTful applications. RESTful applications are client/server protocols in which a client issues an HTTP request message to a service or server and the service or server responds by returning a corresponding HTTP response message. FIGS. 8A-D use the illustration conventions discussed above with reference to FIG. 7 with regard to the client, service, and HTTP protocol. For simplicity and clarity of illustration, in each of these figures, a top portion illustrates the request and a lower portion illustrates the response. The remote client 802 and service 804 are shown as labeled rectangles, as in FIG. 7. A right-pointing solid arrow 806 represents sending of an HTTP request message from a remote client to the service and a left-pointing solid arrow 808 represents sending of a response message corresponding to the request message by the service to the remote client. For clarity and simplicity of illustration, the service 804 is shown associated with a few resources 810-812.

Figure 8A:
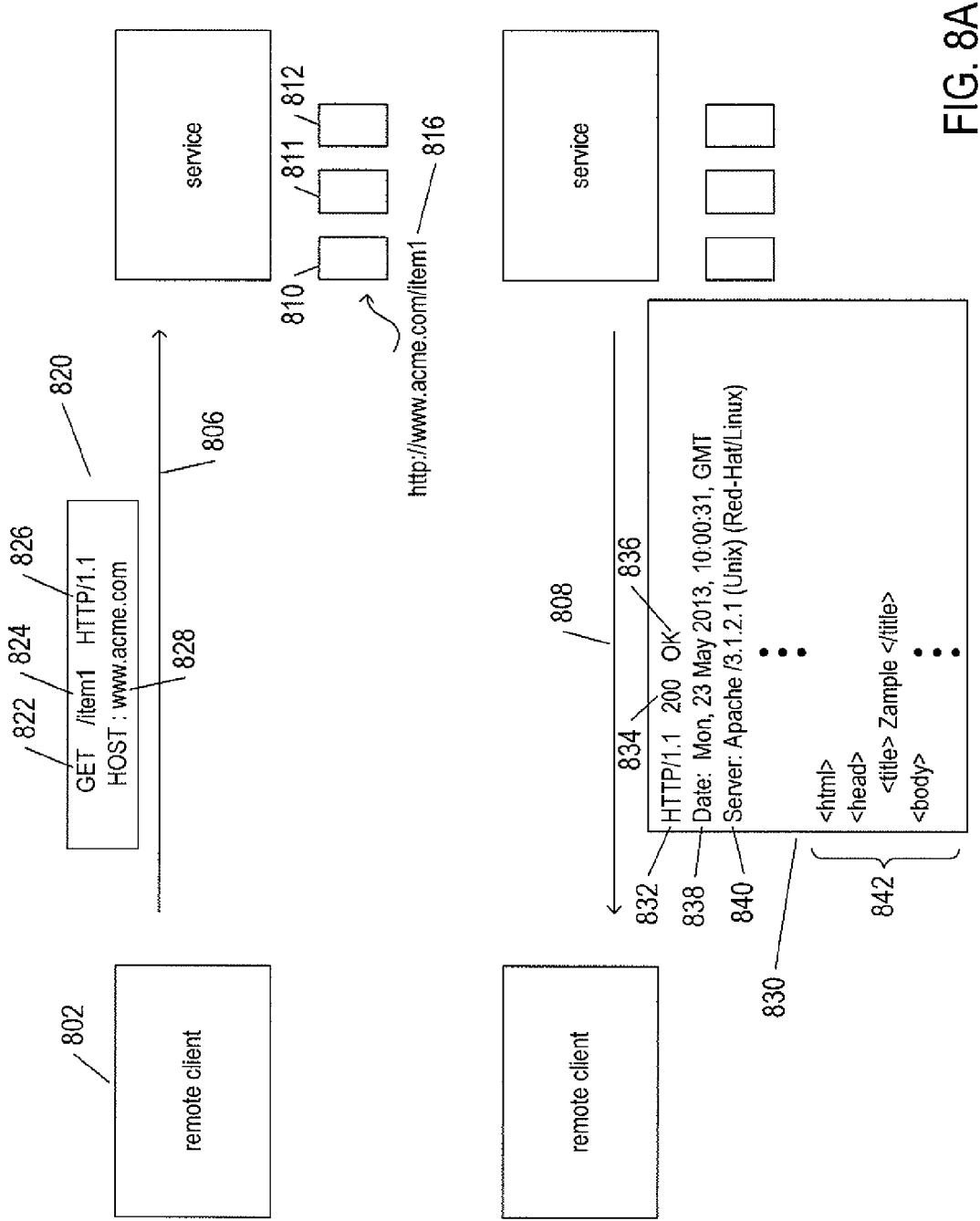
FIGS. 8A-D illustrate four basic verbs, or operations, provided by the HTTP application-layer protocol used in RESTful applications.

FIG. 8A illustrates the GET request and a typical response. The GET request requests the representation of a resource identified by a URI from a service. In the example shown in FIG. 8A, the resource 810 is uniquely identified by the URI "http://www.acme.com/item1" 816. The initial substring "http://www.acme.com" is a domain name that identifies the service. Thus, URI 816 can be thought of as specifying the resource "item1" that is located within and managed by the domain "www.acme.com." The GET request 820 includes the command "GET" 822, a relative resource identifier 824 that, when appended to the domain name, generates the URI that uniquely identifies the resource, and in an indication of the particular underlying application-layer protocol 826. A request message may include one or more headers, or key/value pairs, such as the host header 828 "Host:www.acme.com" that indicates the domain to which the request is directed. There are many different headers that may be included. In addition, a request message may also include a request-message body. The body may be encoded in any of various different self-describing encoding languages, often JSON, XML, or HTML. In the current example, there is no request-message body. The service receives the request message containing the GET command, processes the message, and returns a corresponding response message 830. The response message includes an indication of the application-layer protocol 832, a numeric status 834, a textural status 836, various headers 838 and 840, and, in the current example, a body 842 that includes the HTML encoding of a web page. Again, however, the body may contain any of many different types of information, such as a JSON object that encodes a personnel file, user description, movie list, or movie description. GET is the most fundamental and generally most often used verb, or function, of the HTTP protocol.

Figure 8B:
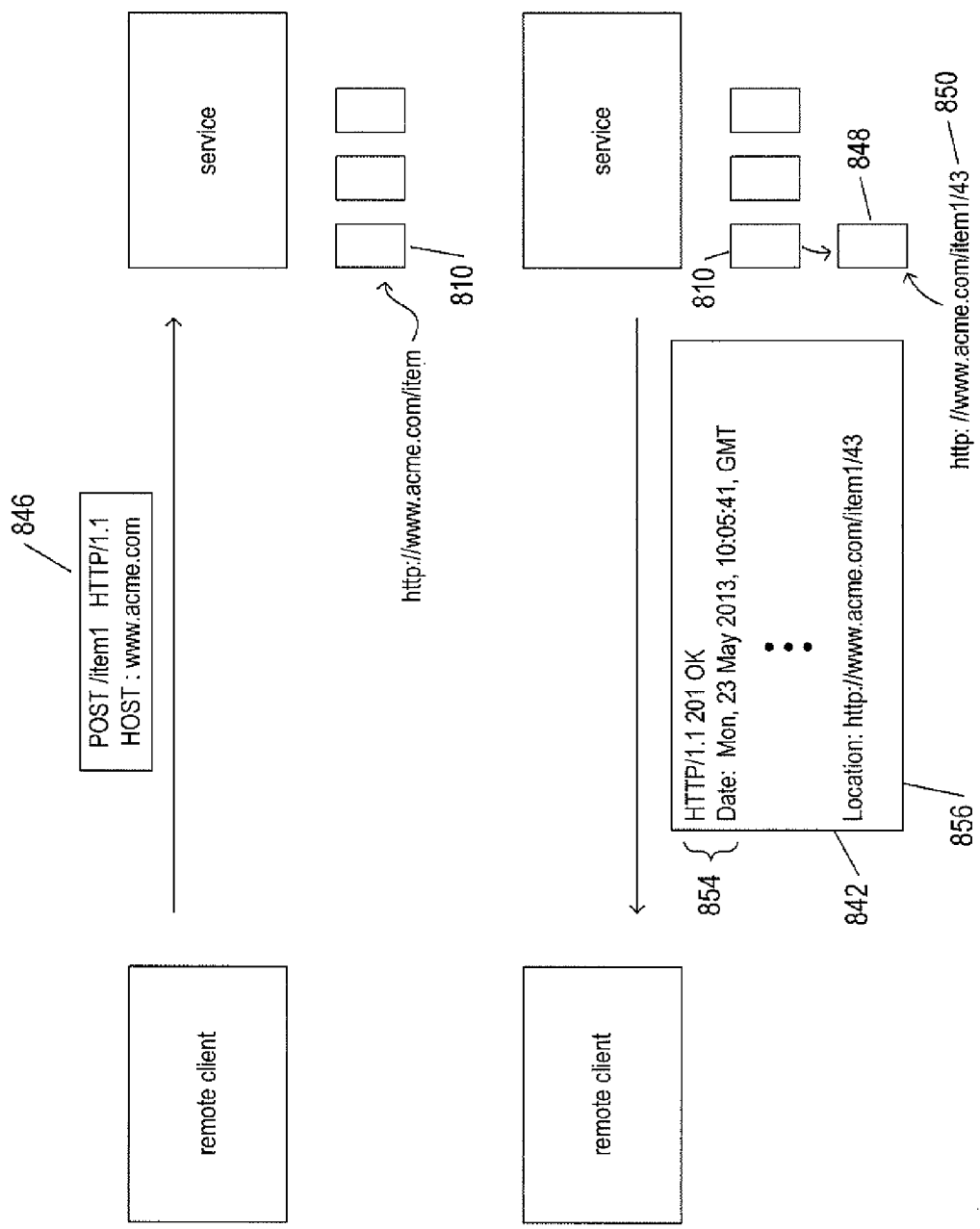

FIG. 8B illustrates the POST HTTP verb. In FIG. 8B, the client sends a POST request 846 to the service that is associated with the URI "http://www.acme.com/item1." In many RESTful APIs, a POST request message requests that the service create a new resource subordinate to the URI associated with the POST request and provide a name and corresponding URI for the newly created resource. Thus, as shown in FIG. 8B, the service creates a new resource 848 subordinate to resource 810 specified by URI "http://www.acme.com/item1," and assigns an identifier "36" to this new resource, creating for the new resource the unique URI "http://www.acme.com/item1/36" 850. The service then transmits a response message 852 corresponding to the POST request back to the remote client. In addition to the application-layer protocol, status, and headers 854, the response message includes a location header 856 with the URI of the newly created resource. According to the HTTP protocol, the POST verb may also be used to update existing resources by including a body with update information.

However, RESTful APIs generally use POST for creation of new resources when the names for the new resources are determined by the service. The POST request 846 may include a body containing a representation or partial representation of the resource that may be incorporated into stored information for the resource by the service.

Figure 8C:
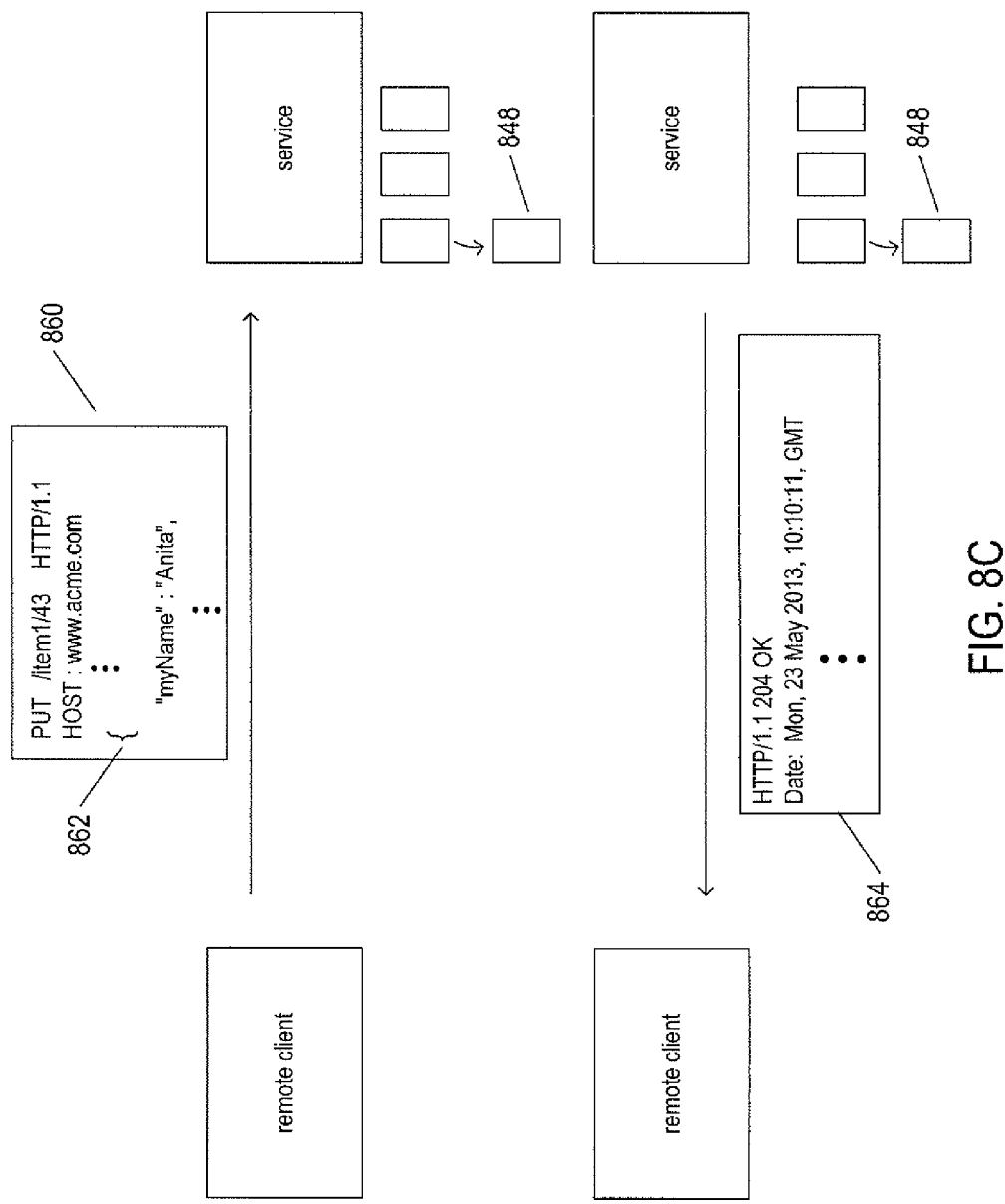

FIG. 8C illustrates the PUT HTTP verb. In RESTful APIs, the PUT HTTP verb is generally used for updating existing resources or for creating new resources when the name for the new resources is determined by the client, rather than the service. In the example shown in FIG. 8C, the remote client issues a PUT HTTP request 860 with respect to the URI "http://www.acme.com/item1/36" that names the newly created resource 848. The PUT request message includes a body with a JSON encoding of a representation or partial representation of the resource 862. In response to receiving this request, the service updates resource 848 to include the information 862 transmitted in the PUT request and then returns a response corresponding to the PUT request 864 to the remote client.

Figure 8D:
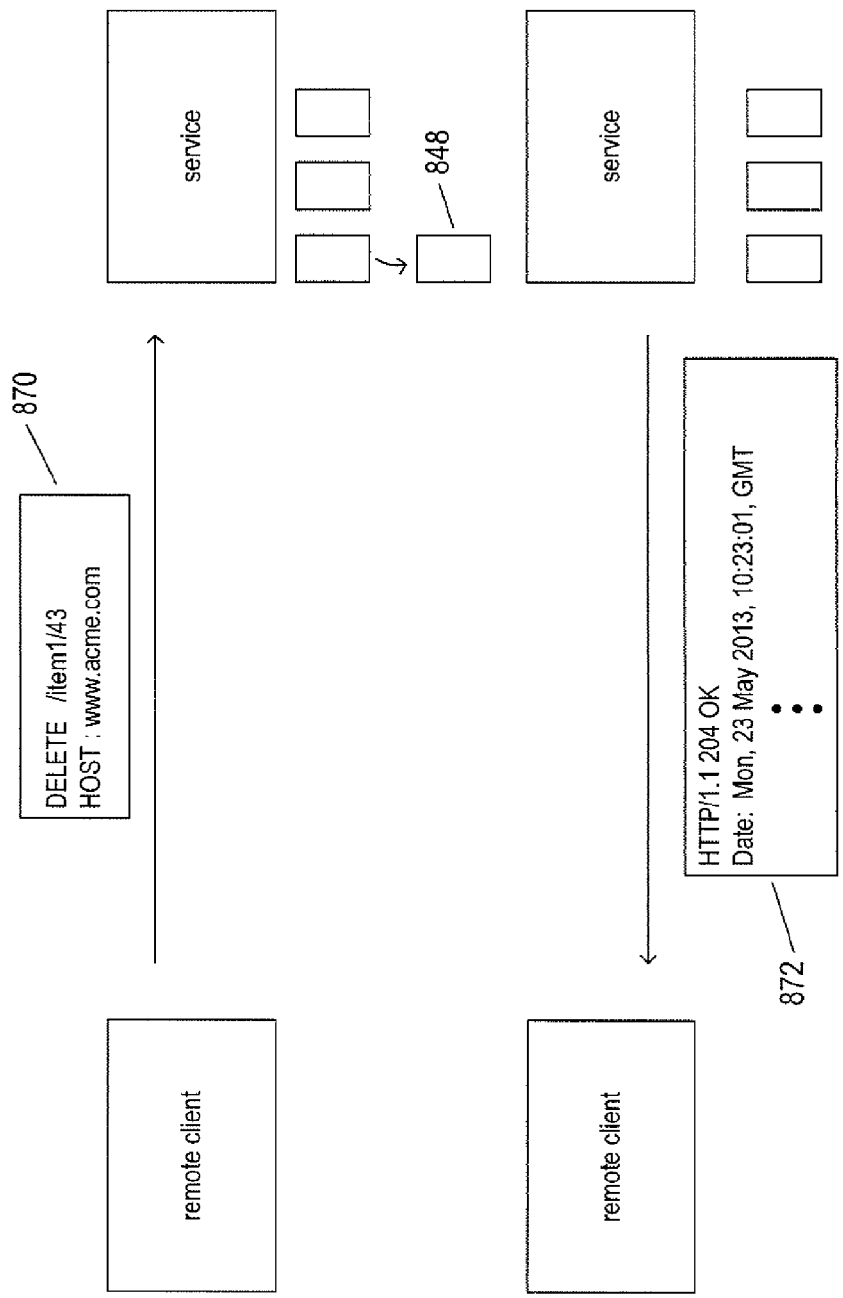

FIG. 8D illustrates the DELETE HTTP verb. In the example shown in FIG. 8D, the remote client transmits a DELETE HTTP request 870 with respect to URI "http://www.acme.com/item1/36" that uniquely specifies newly created resource 848 to the service. In response, the service deletes the resource associated with the URL and returns a response message 872.

As further discussed below, and as mentioned above, a service may return, in response messages, various different links, or URIs, in addition to a resource representation. These links may indicate, to the client, additional resources related in various different ways to the resource specified by the URI associated with the corresponding request message. As one example, when the information returned to a client in response to a request is too large for a single HTTP response message, it may be divided into pages, with the first page returned along with additional links, or URIs, that allow the client to retrieve the remaining pages using additional GET requests. As another example, in response to an initial GET request for the user info resource (710 in FIG. 7), the service may provide URIs 720 and 736 in addition to a requested representation to the client, using which the client may begin to traverse the hierarchical resource organization in subsequent GET requests.

A Data-Aggregation System

The data-aggregation system described in this section can generally aggregate and distribute any of many different types of data to any of many different types of client applications. In the current document, an implementation of the data-aggregation system aggregates data related to movies that can be accessed by users from user devices through the Internet. This movie-data-aggregation system is only one example of the data-aggregation systems that may provide large data sets to client applications.

Figure 9:
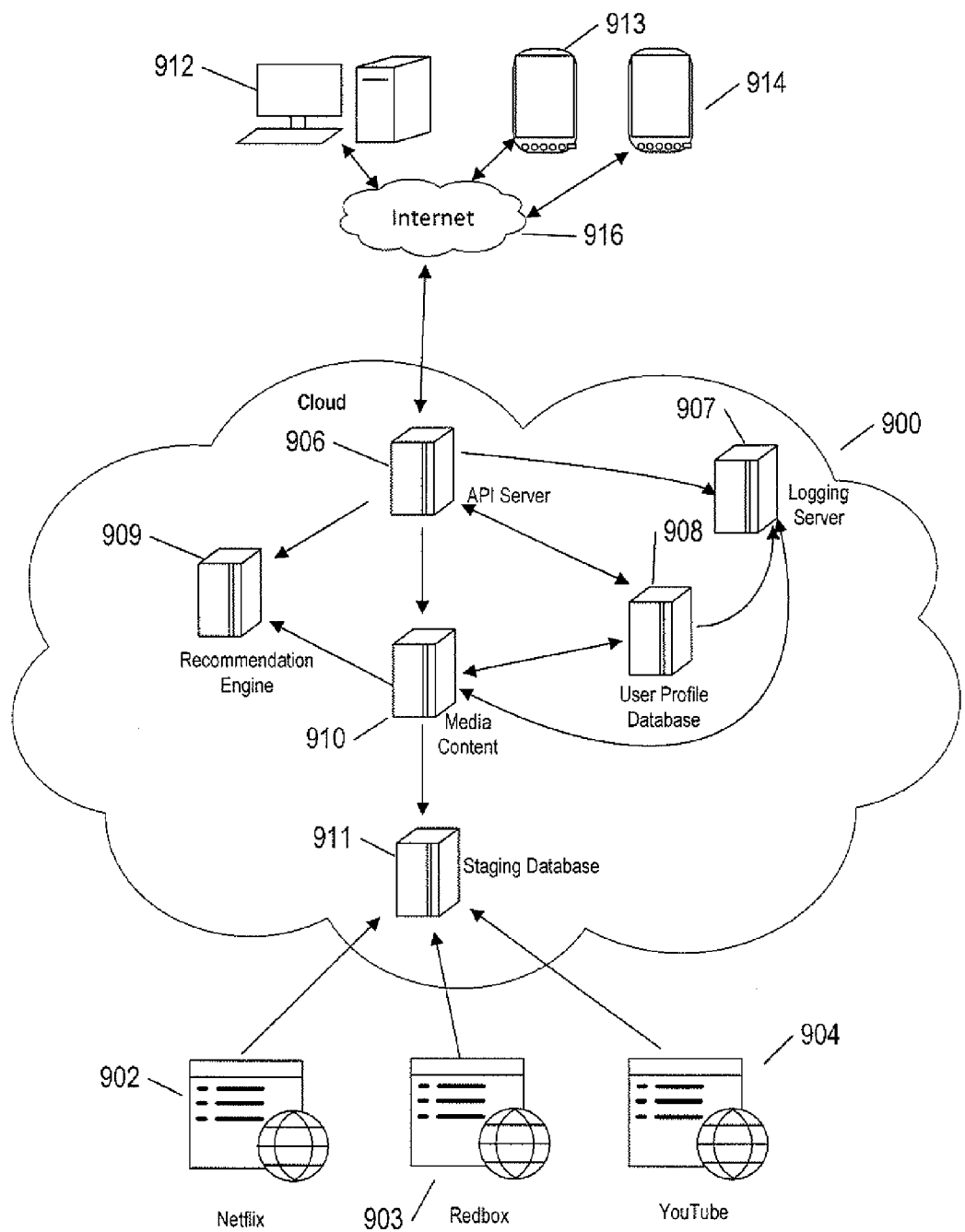
FIG. 9 illustrates a data-aggregation system.

FIG. 9 illustrates a data-aggregation system. The data-aggregation system 900 aggregates information from different data resources 902-904, including search engines, databases, and/or information services. In one implementation, the data-aggregation system 900 comprises a group of intercommunicating servers 906-911 that include one or more API servers 906 and one or more back-end data servers 908-910. The API server is interconnected to a plurality of client devices 912-914 by networks, communications systems, and communications media generally referred to as the "Internet" 916. The API server 904 and the back-end data servers, in the described implementations, are hosted in a public cloud-computing facility.

The back-end data servers 908-910 provide movie-browsing guides and data storage, manage account information for users, and carry out various additional tasks. The data servers may aggregate and curate raw data collected from proprietary servers as well as third-party providers hosting free or subscription-based content. For example, third-party providers 902-904 may include websites that collect, store, and deliver movie content and related metadata, such as Netflix, YouTube, Redbox, and many other third-party service providers.

In one implementation, the back-end data servers comprise a plurality of server computers and computer clusters, including a logging server 907 that aggregates log data streamed in real-time from other internal servers, one or more user profile database servers 908, one or more recommendation-engine servers 909, a media-content cluster 910, and a staging database cluster 911. The one or more user profile database servers 908 store user information, such as user account information, which include user names, authentication credentials, user preferences, watch lists and movie collections for users, and other information.

Staging database cluster 911 processes, ingests, and validates raw data, such as movie content and related metadata, from various services, including Netflix, YouTube, and Redbox. The frequency of data ingestion varies with the frequency of which raw data is made available by the services. The ingested raw data in the staging database cluster 911 is further curated to ensure accuracy and additional metadata may be added to the curated data to facilitate organization and indexing of the curated data. The curated data is then pushed to the media-content cluster 910 for consumption by client-side applications executed in client devices 912-914. Client-side applications access the data stored by the media-content cluster 910 through the API server 906. The one or more recommendation-engine servers 909 further filter the media content and related metadata stored in the media-content cluster 910. The one or more recommendation-engine servers 909 may also produce lists of recommendations for users through collaborative or content-based filtering. For example, in collaborative filtering, a model is built from items accessed by the user and from the user's past behavior, including movies the user has given numerical ratings to or shown interest in, items the user previously purchased or selected, and behaviors exhibited by other users in the user's community. The model is then used to predict items in which the user may have an interest. In content-based filtering, a series of discrete characteristics of an item are utilized to recommend additional items with similar characteristics. These approaches can be used individually or combined for curating the recommendation list. The data filtered by the one or more recommendation-engine servers 909, together with the data stored in the media-content cluster 910, is cached in the API server 906 for client-side-application consumption. The data-aggregation system 900 includes many other types of systems and layers to facilitate data-management and data-transfer. Certain of the stored data sets may be redundantly stored to create multiple versions of data sets. Multiple data sets can be made available to other APIs and applications and may serve as back-up sources. Additionally, the data sets can be partitioned among various physical server computers to allow for efficient access.

One implementation of the currently described methods and systems includes a client-side application that runs on a personal computer, laptop, notebook, smart phone, or other user device, generally in the context of a web browser. The client-side application communicates, through a device operating system and the Internet, with one or more server-side API servers. The client-side application creates and transmits requests to the one or more API servers. The one or more API servers process the request by querying the back-end data servers. The one or more back-end servers access a hierarchically organized set of resources, Internet-connected information services, and/or databases and caches on behalf of client-side applications in order to process queries submitted to the one or more back-end servers, on behalf of the client-side application, by the one or more API servers. The one or more back-end data servers return query responses to the one or more API servers, which then return the requested results and related data to the client-side application. The request/response communications are carried out, in one implementation, using the RESTful approach based on the HTTP/HTTPS protocol. Requests from the client-side application include requests for authorization, storage of data, retrieval of data, modification of data, and deletion of data. The client-side application undertakes rendering of returned data into various different types of visual representations provided to users through a multi-rotor, data-carousel-based interface described in following sections, including carrying out lower-level graphics processing in order to render representations of query results for display to the user. The one or more API servers provide various sets of RESTful APIs through which client-side applications access different types of data and services, including an authorization API, a view API, a user API, a collection API, and other APIs. The authorization API provides user-login-related services. For example, a GET request "GET http://www.acme.com/api/authorization/signup" allows a client application to create an account for a new user. As another example, a POST request "POST http://www.acme.com/api/authorization/signin" allows a user to login with an email address and password information. An example authorization request message is provided below:

```
POST /authorization/signin HTTP/1.1
HOST: www.acme.com
Accept: application/json
Content-Type: application/json
Body: { "email": " ", "password": " " }
```

The authorization API can also call other social media APIs, such as the Facebook API, to bind accounts.

Another set of calls is referred to as the "view API". The view API is provided for retrieving details about an entity. For example, a GET request "GET http://www.acme.com/api/view/2334f7b2-8a01-11df-b0b0-7df443d5c70b/detail" allows a user to retrieve details about an entity represented by the entity URI "2334f7b2-8a01-11df-b0b0-7df443d5c70b". The entity may be a movie item, and details about the entity may include media metadata for the movie, such as the name of the movie, the cast members, the ratings, the synopsis of the movie, and other such information. Additional APIs can be provided for access to playable actions for a movie, TV-show information for a season or an episode, or other such information.

Another set of calls is referred to as the "user API". The user API is provided for managing user information, including a user ID, user profile, user picture, user preferences, a user's movie collection, user rated movies by genre, people following the user in a social network, people whom the user is following, a list of activities of the user, and other user information.

The collection API is provided for retrieving a collection of entities that match the query parameters specified in requests for data from the data-aggregation system, a collection count, and other properties of the collection, such as category, subcategory, and tags. The API server provides resources that allow for the retrieval of partial information using query parameters so that client-side applications avoid transferring, parsing, and storing unneeded data. The various APIs can be extended to accommodate additional information and types of information that may reside in, or that can be accessed by, the data-aggregation system.

Responses to various types of requests submitted to the one or more API servers are often coded in JSON and transmitted back from the one or more API servers to the application using the RESTful approach and the HTTP/HTTPS protocol. Responses may include status codes, either numeric or descriptive, and many different types of requested data. For example, a response to an API call for accessing a movie-collection list is provided below:

```
{"data":
{
    "collectionId": "12",
    "totalItem": "4",
        "startIndex": "0",
    "items": [
        {
            "id": "60021896",
            "box_art":
"http://www.acme.com/boxshots/60021896.jpg",
            "title": "Harry Potter",
            "release_year": "2001",
            "average_rating": "1.9",
                "mpaa_ratings": "NR",
            "synopsis_url":
"http://www.acme.com/catalog/titles/movies/60021896/synopsis",
                "directors":
"http://www.acme.com/catalog/titles/movies/60021896/directors",
                "cast":
"http://www.acme.com/catalog/titles/movies/60021896/cast",
                "facebook_url":
"http://www.acme.com/60021896/facebook"
        },
        {
            "id": "17985448",
            "box_art":
"http://www.acme.com/boxshots/17985448.jpg",
            "title": "Aliens",
            "release_year": "1996",
            "average_rating": "3.7",
                "mpaa_ratings": "NR",
            "synopsis_url":
"http://www.acme.com/catalog/titles/movies/17985448/synopsis",
                "directors":
"http://www.acme.com/catalog/titles/movies/17985448/directors",
                "cast":
""http://www.acme.com/catalog/titles/movies/17985448/cast",
                "facebook_url":
"http://www.acme.com/17985448/facebook"
        },
        {
            "id": "10956",
            "box_art": "http://www.acme.com/boxshots/10956.jpg",
            "title": "A Lone Star",
            "release_year": "1986",
            "average_rating": "3.1",
                "mpaa_ratings": "PG-13",
            "synopsis_url":
"http://www.acme.com/catalog/titles/movies/10956/synopsis",
                "directors":
"http://www.acme.com/catalog/titles/movies/10956/directors",
                "cast":
""http://www.acme.com/catalog/titles/movies/10956/cast",
                "facebook_url":
"http://www.acme.com/10956/facebook"
        },
        {
            "id": "8786592",
            "box_art": "http://www.acme.com/boxshots/8786592.jpg",
            "title": "Thor,"
            "release_year": "2011",
            "average_rating": "1.1",
                "mpaa_ratings": "PG",
            "synopsis_url":
"http://www.acme.com/catalog/titles/movies/8786592/synopsis",
                "directors":
"http://www.acme.com/catalog/titles/movies/8786592/directors",
                "cast":
""http://www.acme.com/catalog/titles/movies/8786592/cast",
                "facebook_url":
"http://www.acme.com/8786592/facebook"
        }
    ]
}, "status":{"code":200, "message":"OK"}}
```

The response contains four movie items, each item having attributes, including box art representing the movie, a title, a release year, an average rating, a synopsis, directors, cast members, and a URL for connecting to a Facebook page. URLs may be provided to allow for access to associated information. For example, for the movie item with the ID 8786592, a box art image can be fetched using the URL http://www.acme.com/boxshots/8786592.jpg and a synopsis can be fetched using the URL http://www.acme.com/catalog/titles/movies/8786592/synopsis.

Data Presentation in a Data-Carousel-Based Graphical User Interface

Application programs designed to run on computer systems allow users to perform a wide variety of functions including scientific computations, business applications, entertainment, and so on. Many application programs include a graphical user interface (GUI). The GUI typically includes various different icons, menus, list boxes, and/or other display features that allow users to browse, select and execute commands. When a user selects a window or an icon, new display features may be displayed on the display showing information related to the theme of the selected icon. Often the new display features include additional icons, windows, or list boxes that allow users to select and receive even more detailed information. GUI may also include hyperlinks that allow a user to navigate to other sites, initiate execution of additional application programs, and/or command a device to execute various functions. In some cases, application GUIs are configured to present data items that are extracted from a remote database and made available to users to browse and select.

One challenge faced by GUI designers is the limited display space available on a device display, such as a computer monitor, television set display, and in particular, a hand-held device such as a mobile phone. To increase the number of data items displayed simultaneously within limited display space, data items may be displayed vertically in a scrollable list or a grid controlled by a scroll bar on one side of the display screen. Likewise, data items may also be displayed horizontally in a filmstrip presentation, which may include a horizontal listing of data items coupled with a scroll bar below the displayed items or rotation features that rotate the items displayed in the horizontal list. The data items that do not fit within the vertical or horizontal display features can be accessed for viewing by a user swiping his or her fingers on a touch screen surface or scrolling with a computer mouse. One problem associated with these traditional data-presentation methods is navigation or swipe fatigue from excessive sliding or swiping in large pannable regions. The current disclosure discusses a new method, in the following sections, that presents and displays a large set of data in a multi-rotor, data-carousel-based GUI.

A data carousel, or carousel, provides a two-dimensional display of a logical three-dimensional cylindrical section with a circular or elliptical cross section, along the outer surface of which visual renderings of data items are displayed. The carousel can be controlled to rotate in order to display data items that are located on portions of the three-dimensional surface that are not visible to the user in the two-dimensional projection of the three-dimensional carousel at the carousel's current rotational position. The carousel may be integrated into an application program, such as, for example, an application program that compiles and displays media content, including movies, TV shows, music, books, and games.

FIG. 10 shows a carousel-display-panel component of a multi-rotor, data-carousel-based GUI containing a top-level topic rotor and a result rotor. The top-level topic rotor 1002 displays categories, each category 1004 corresponding to at least one result rotor 1006 containing a limited number of reusable data bins. A user may select a category of interest from among all the categories displayed in the top-level rotor to display data items belonging to the selected category in the result rotor. In the example shown in FIG. 10, the user has selected the category "In Theatres" 1005. After receiving the user selection, data items corresponding to the selected category are displayed in data bins of the result rotor 1006. In FIG. 10, different types of crosshatching are used to represent rendering of data items that are displayed to the user. Each data bin 1008 in the result rotor 1006 is associated with a data item. Data items are generally, in turn, associated with attributes. The selection of data items for display in the result rotor is based on the evaluation of the correspondence between attribute values of the data items and attribute values expected for data items of the selected category. The user may request that attribute values associated with data items be displayed. Attributes may include a title, one or more images, screenshots, video clips, a cast listing, one or more reviews, links to various distribution channels for playing or further browsing the data item, and so on. A graphical rendering of the data item associated with a data bin, such as a movie poster associated with a movie data item, is displayed on the external surface of the data bin. The total number of data bins included in the result rotor may be pre-defined by developers in accordance with the dimensions of the display space of the user device. For example, a TV display may have 50 data bins, while a mobile device may have only 25 data bins. In other implementations, the number of data bins is determined, at the time of carousel display, from characteristics of the user device. Data bins are evenly distributed around the circumference of the carousel, in one implementation. The number of data bins and the radius of the carousel are constant and do not change as the number of items to be displayed increases or decreases, in the described implementation.

A termination marker 1010 may be included in the data displayed in a result rotor of the multi-rotor, data-carousel-based interface. The termination marker 1010 is a special graphic object that indicates that the last item in a carousel has been reached. As one example, a data bin that displays the phrase "The End" may serve as a termination marker. Following the termination marker, in certain implementations, the display wraps around from the termination marker back to the first data item of the list of data items displayed in the carousel.

Data items and associated metadata may be stored in various data sources and metadata repositories, such as one or more databases 1010-1014 of the data-aggregation system shown in FIG. 9. The data items are retrieved and aggregated, by the API server, after the API server receives a request for display of data items from the client application. Database queries may be executed to extract data items 1022-1028 from the database tables. A list of data items returned by the queries 1030 may be temporarily stored in one or more databases or in buffers in, or accessible to, the API server, with subsets of the data items loaded to memory for transfer to a user device when the user sends requests for additional data items for display. In certain cases, data items may be pre-loaded into the memory of a client device when the client application program is launched in order to save initial data-retrieval and data-transfer time. The API server may initially return only a portion of the data list to the client application. The client application may request additional data items by making subsequent requests to the API server. The lists of data items returned from the API server may be further filtered by specific attributes and grouped into subcategories by the application program.

The result rotor 1006 automatically rotates, continuously revealing new data items as already-displayed data items rotate out of view, allowing the user to continuously view data items without providing navigation inputs, such as swipes or scrolls. The result rotor spins at a rotational speed that may be pre-defined for the user device or that may be configured by the user. The rotational speed is, in certain implementations, selected from among multiple discrete rotational speeds or from a continuous range of rotational speeds. The data items fade out of existence as they leave the viewable surface of the carousel. The data items corresponding to those bins with external surfaces pointing away from the user or obscured by the portion of the rotor logically closest to the user are not displayed to the user.

Content awareness is another feature of the data-carousel-based GUI disclosed in the current document. Content awareness relates a display mode selected for a carousel to the number of data items contained in the list to be displayed by the carousel. In certain cases, the number of data items in a list may be shorter than the total number of data bins available within a rotor. In this situation, empty bins may be left unpopulated. As the rotor spins and reaches the last data bin, the rotor may fast forward to the first data bin. As another example, the rotation speed of a result rotor may be set to a speed that depends on the number of data items associated with the result rotor.

Figure 11A:
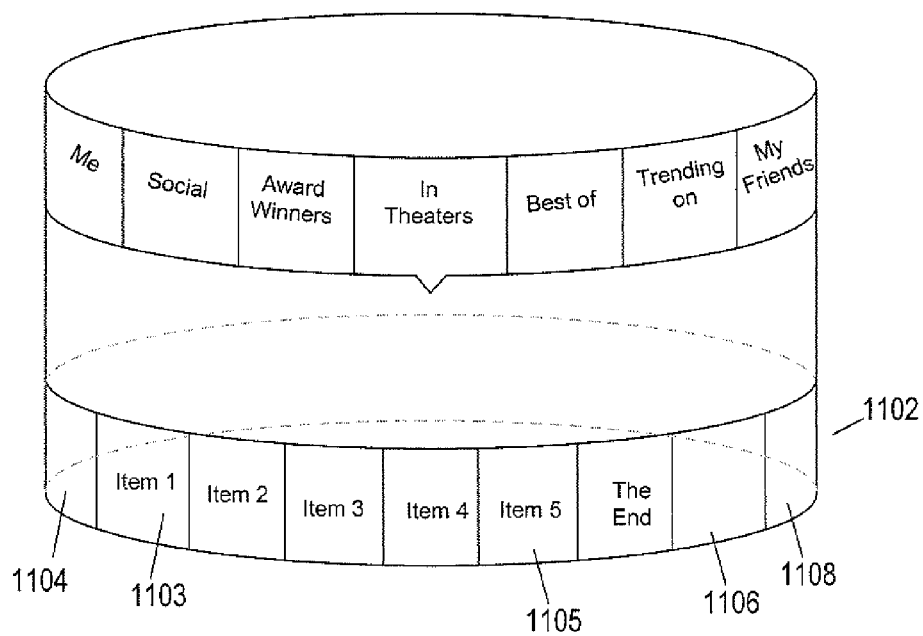
FIGS. 11A-B show a carousel-display panel containing a result rotor populated with data items.
Figure 11B:
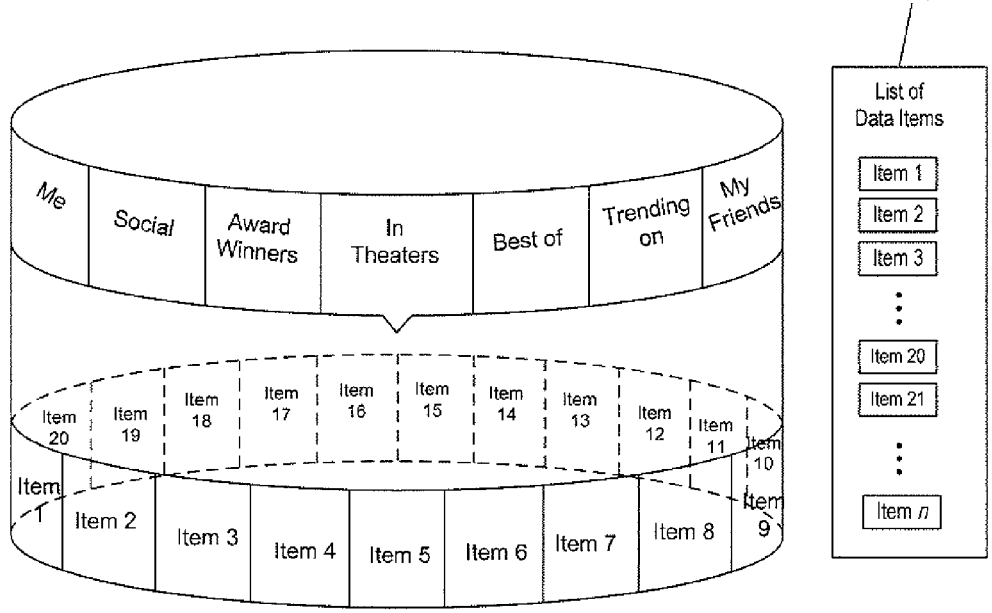

FIGS. 11A-B show a carousel-display panel containing a result rotor populated with data items. The result rotor shown in FIGS. 11A-B contains a limited number of data bins, for example, 20 data bins, that may be pre-determined or selected by the application or by the user. To populate data items in a result rotor, the system first determines whether the number of data items in the list is less than, equal to, or larger than the total number of data bins. When the number of data items in the list is less than or equal to the total number of data bins, a rendering of each data item in the list is placed in an individual data bin on the result rotor. In the case of the result rotor 1102 shown in FIG. 11A, for which the five data items in the list is less than the total number of data bins of the result rotor, the five data items are each placed into a successive data bin starting with data item 1 (1103 in FIG. 11), the first data item in the list, and ending to data item 5 (1105 in FIG. 11), the last data item in the list. Excess data bins, including data bins, 1104, 1106, and 1108 and the data bins currently not visible in the two-dimensional projection of the logically three-dimensional result rotor 1102, are left empty. When the number of data items in the list is larger than the total number of data bins, a portion of the data items in the list are loaded into the result rotor for display. For example, as shown in FIG. 11B, the first twenty data items of a data list 1110 that contains the data items retrieved from the remote data server are placed in successive data bins of the result rotor, of which the first nine data items are displayed to the user from the front of the carousel-display panel. The remaining data bins, containing renderings of data items 10-20, are not visible from the current rotational position of the result rotor. The remaining data items not yet associated with the data bins, beginning with data item 21, are subsequently placed into the data bins as the rotor automatically spins. The data list 1110 may be stored in a circular buffer in order to facilitate reading data items from the buffer while adding new data items to the buffer.

Figure 12A:
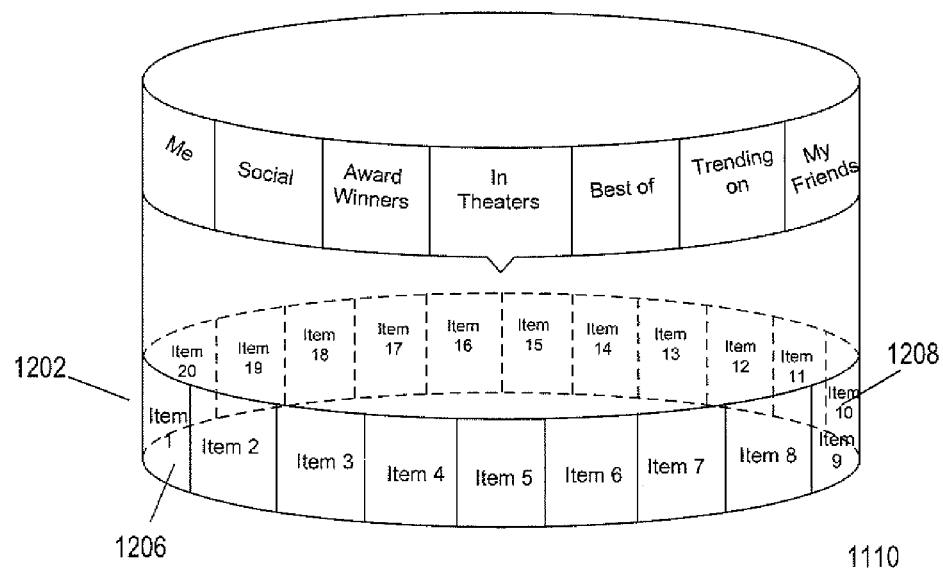
FIGS. 12A-C illustrate loading of data items in the rotor.
Figure 12B:
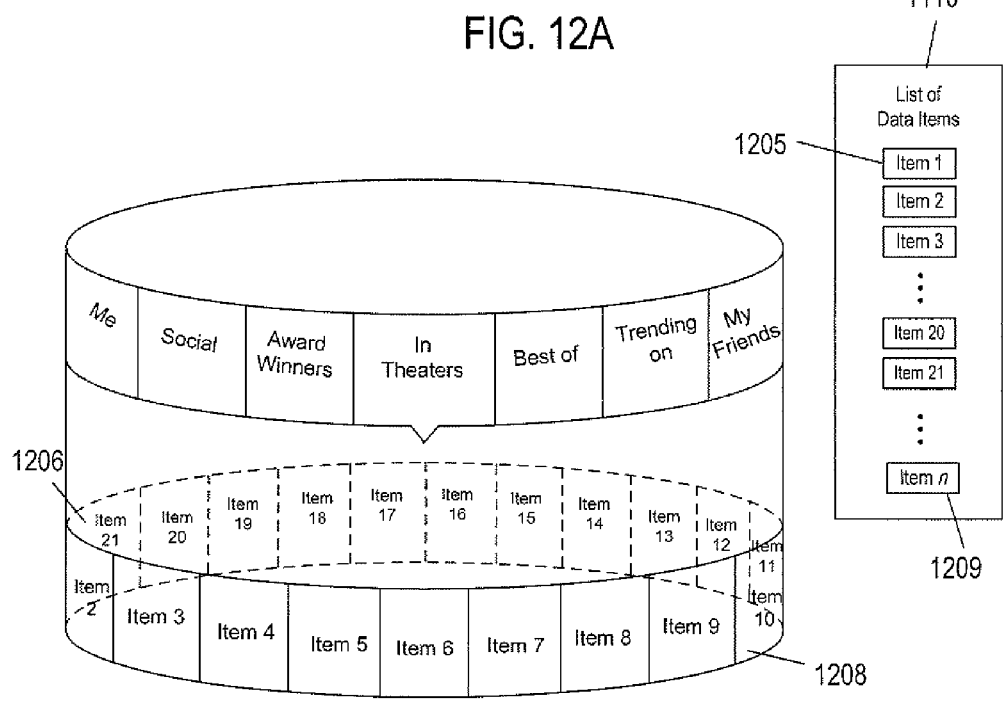
Figure 12C:
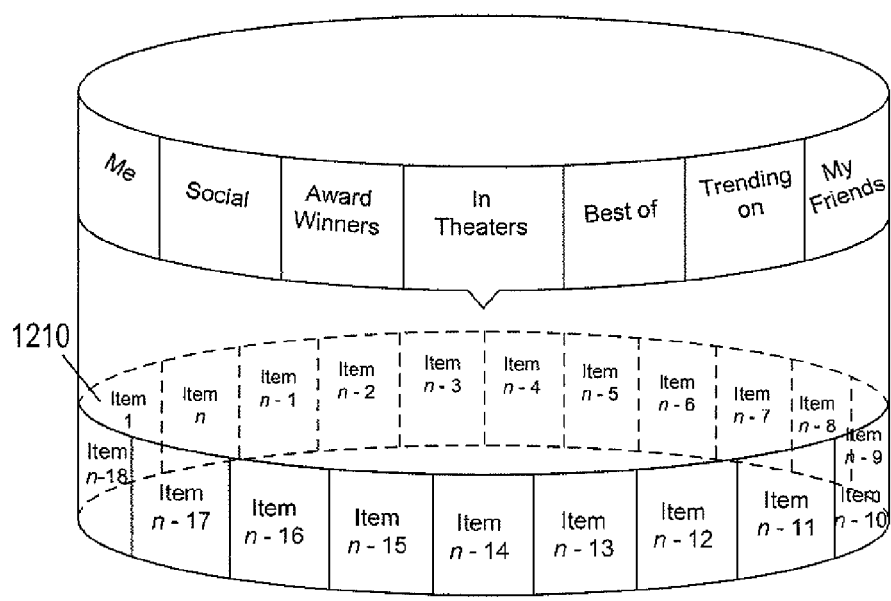

FIGS. 12A-C illustrate loading of data items in the rotor. In this example, the result rotor 1202 in FIG. 12A contains 20 pre-determined data bins that have been initially populated with the first 20 data items in the data list 1110. The result rotor 1202 can spin in a clockwise direction or an anti-clockwise direction to reveal data items in the list depending on a user input. As shown in this example, the result rotor 1202 spins from right-to-left to reveal the next item in the list, the application program determines when the next bin 1206 becomes available for association with a next data item. The data bin 1206 becomes available for association with a next data item when the data bin disappears from the left edge of the rotor and is no longer visible to the user. Simultaneously, the data bin 1208 appears from the right edge of the rotor to display a rendering of data item 10. When the number of data items contained in the list 1110 is less than or equal to the total number of data bins, the data items in the list have been loaded into the data bins, therefore no update is needed. When the number of data items in the list is larger than the total number of data bins and additional un-displayed data items remain in the list, then a next data item is moved from the list into the newly available data bin. In FIG. 12B, data item 21 is associated with the newly available data bin 1206. As the rotor cycles through the entire set of the data bins, data item 21 will eventually rotate into view and a rendering of data item 21 will be then displayed to the user. When the end of the list has been reached, as shown in FIG. 12C, the list is reset so that the first data item in the list, item 1, is next associated with the newly available data bin 1210.

Note that the data bins in the result rotor shown in FIG. 12 are recycled as the rotor spins to display the data items in the list. As a result, the result rotor is capable of displaying an essentially infinite number of data items contained in the list as the carousel cycles through the set of data bins. Additional data items can be continuously requested, by the user device, from the data-aggregation system and returned to the user device for display during display of data items by the result rotor. In certain implementations, the user device requests additional data items for display from the data-aggregation system only when the result rotor is capable of displaying the data items to the user. For example, in certain implementations, the result rotor needs to be spinning and conveniently visible to the user.

While in free spin, the rotor rotates at a constant speed. But the user can interrupt the free spin by swiping a finger on a touch screen display to the left or to the right. Each swipe implies a rotation from the current rotor position to another position. The user may swipe the touch screen at different velocities. For example, a high velocity swipe causes the rotor to be rotated at higher rate. The carousel rotor may slowly come to a stop on a data item to which the user navigates with the swipe. Once free spin is interrupted, an inactivity timer is set. When there is no further action from the user following setting of the inactivity timer up to expiration of the inactivity timer, free spinning resumes. The user may repeatedly manually spin the result rotor using a finger swipe, and the user can click a data item of interest to make a selection and stop rotation of the result rotor.

The user can touch a finger, or input a mouse click, to a data bin in order to display the metadata associated with the data item. When the user selects a data bin in this fashion, information related to the data item is displayed in a new pop-up window, by displaying over the original contents of the data bin, or by using another information-display feature. For example, a new display window may feature one or more navigational panels or icons devoted to different aspects or details of the movie item, including a synopsis panel, a cast panel that lists the cast of the movie item, a review panel with reviews about the movie, a viewable trailer for the movie, a similar-content panel that displays information about related movie items, and other types of information. The client application may also aggregate and present a variety of remote sources to the user from which the user is able to stream or access the media content. For example, the user may make a selection and choose to watch the movie through an external source, such as Netflix or YouTube. The display window may have options that allow the user to make comments and recommendations, share an interest in a movie with other users through network connections, or add the movie to a watch list to be watched later. The user may navigate among panels using horizontally or vertically directed gestures or by using a scroll bar. At any panel, the user may select one of the items displayed in the panel, for example a similar movie item in the similar-content panel, and is directed to a new hierarchical information display with more detailed information and/or hyperlinks that allow navigation to other sites or initiation of additional application programs. In certain implementations, navigation tools are provided in the pop-up window to allow users to navigate from the current data item to the next data item of the result rotor without leaving the pop-up window. The user may also close the window by clicking a cross button located on the upper right corner of the pop-up window. In certain implementations, breadcrumb navigation features are provided to indicate the steps or paths a user has taken to arrive at the current window and to provide a return path to previously viewed information. The user can close the current window and return to the upper level display window by touching the navigation history.

The application program also provides additional mechanisms, such as a search function allowing a user to search for a particular data item. The search function may access a search-engine component that permits users to enter search queries in order to retrieve relevant data items. The search function also accesses a back-end component that performs a search of stored data items and associated metadata to identify relevant search results. The stored data items may include data items retrieved from the data-aggregation system in addition to the data items currently associated with result-rotor data bins.

Figure 13:
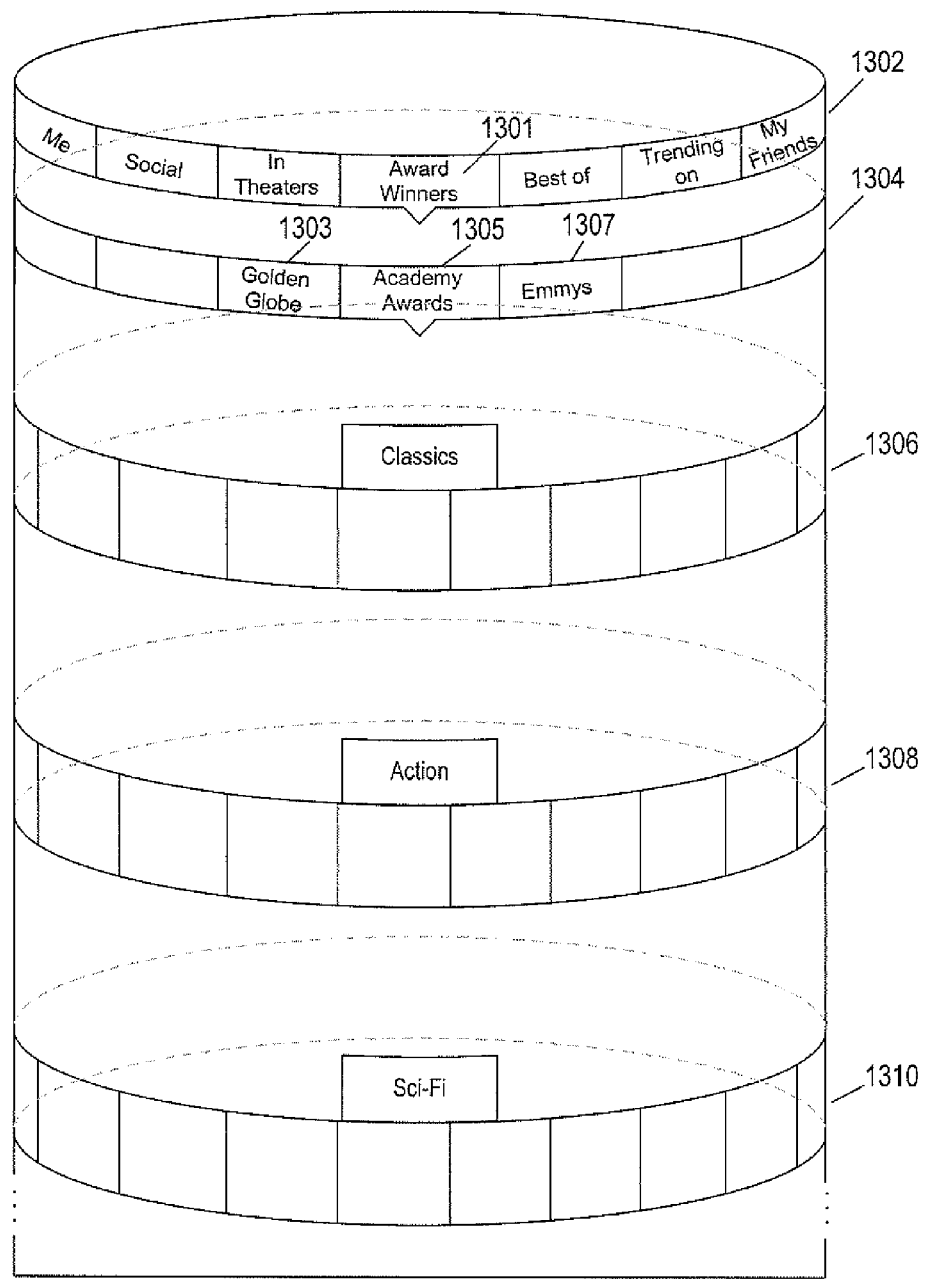
FIG. 13 shows a carousel-display panel containing a top-level rotor, a sub-rotor, and a plurality of result rotors.

FIG. 13 shows a carousel-display panel containing a top-level rotor, a sub-rotor, and a plurality of result rotors. In many implementations, for each category displayed in the top-level rotor 1302, the carousel may provide one or more sub-rotors 1304, each sub-rotor displaying sub-categories for the next-highest category or sub-category associated with the sub-rotor. The set of the top-level rotor and any additional sub-rotors is further associated with one or more result rotors, each result rotor displaying renderings of data items associated with a selected sub-category. For example, as shown in FIG. 13, a user has selected the "AWARD WINNERS" category 1301 from the top-level rotor 1302. For this category 1301, the carousel provides a sub-rotor 1304 displaying three sub-categories: "Golden Globe" 1303; Academy Awards 1305; and Emmys 1307. The "Academy Awards" sub-category 1305 is selected by default. The user may select a different sub-category from the sub-rotor using a control device such as a remote TV control, keyboard, a computer mouse, or fingers when displayed on a touch screen. In the example shown in FIG. 13, a list of "Academy Awards" movies is extracted from one or more database tables by the data-aggregation system and returned to the client application, which loads the list into memory, and then filters and groups data items according to pre-determined filtering criteria, for example, "Classics", "Actions", "Sci-fi", and other such categories. Alternatively, the filtering function may operate in conjunction with the API server to retrieve only those data items that meet a particular filtering criterion. As the user selects a category and a sub-category, the groups of data items meeting the filtering criteria are placed into the self-propelled result rotors 1306, 1308, and 1310 for display. The user may scroll downward to reveal additional result rotors, when additional result rotors are present but not displayed. The result rotors 1306-1310 are concentrically stacked, with each result rotor automatically spinning at a particular speed, generally independent of the other rotors. The rotational speeds of the multiple result rotors may differ so that result-rotor rotation is not synchronized. In certain implementations, the rotational speed of a result rotor may be varied over a repeating time interval. Similar to the result rotor 1006 shown in FIG. 10, a result rotor may halt when the user interacts with the result rotor and may resume spinning after a period of inactivity.

Figure 14A:
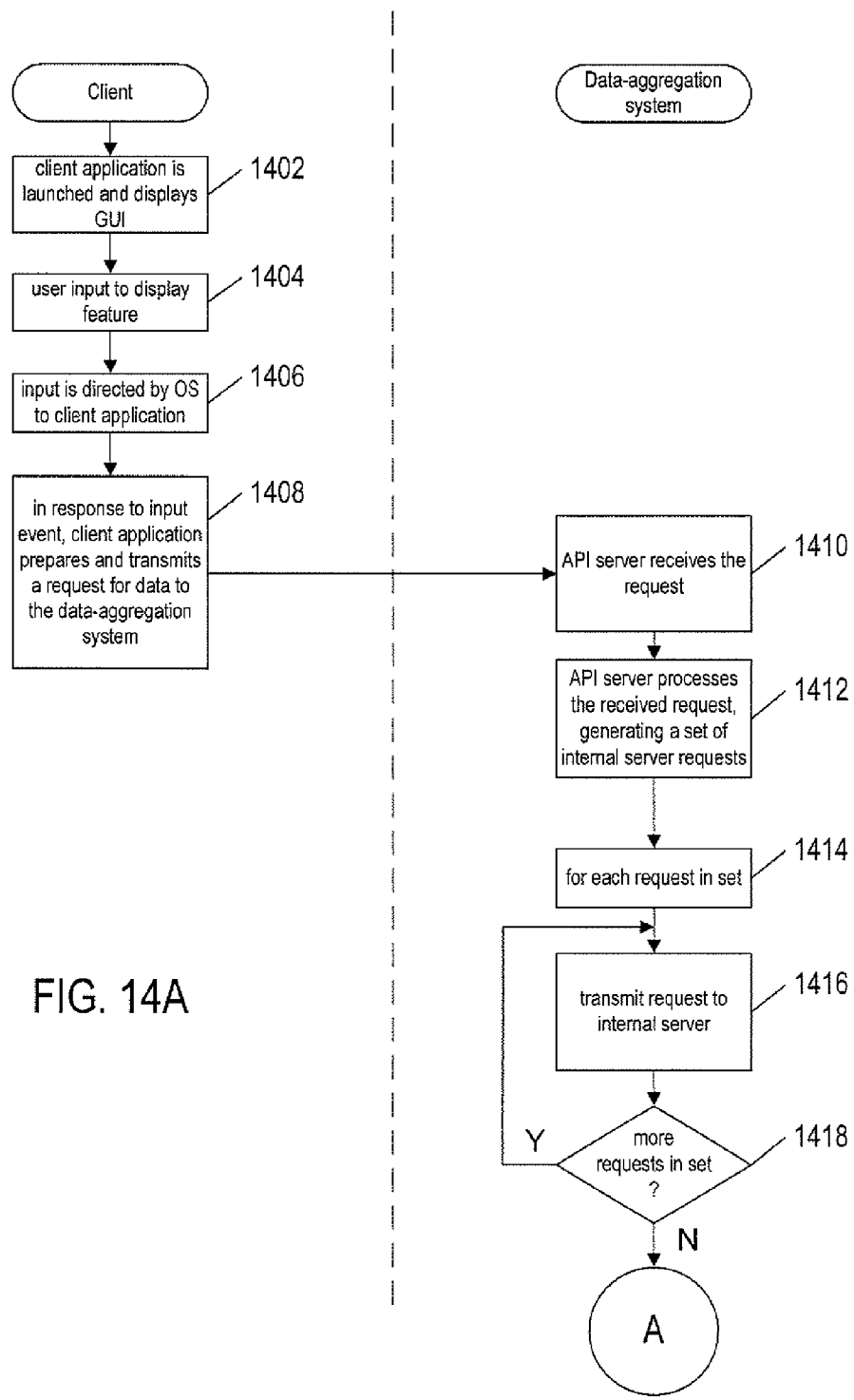
FIG. 14A-B illustrate a control-flow diagram for a client device requesting data from a data-aggregation system via a data-aggregation system-API FIG. 15A-B provide a control-flow diagram that illustrates loading and displaying of new data items in a result rotor.
Figure 14B:
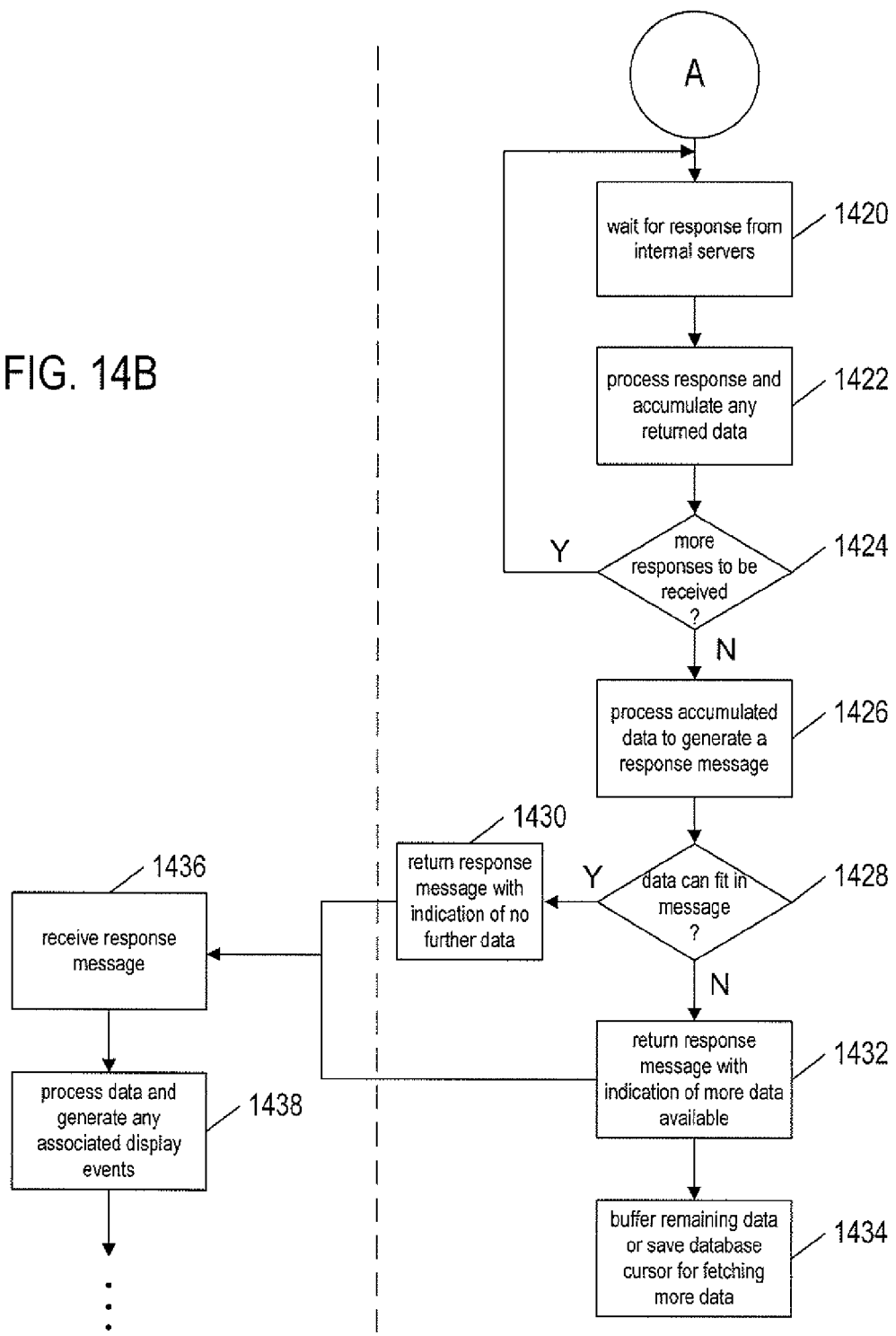

FIG. 14A-B illustrate a control-flow diagram for a client device requesting data from a data-aggregation system via a data-aggregation system-API. In step 1402, on the client side, a client application is launched, for example, a mobile application that compiles media content, including movies, TV shows, music, books, and games, and displays a GUI. In step 1404, user input to a display feature is detected. In step 1406, the input is directed by the client-device operating system to the client application program. In step 1408, in response to the input event, the client application program prepares and transmits a request for data to the data-aggregation system. In step 1410, on the data-aggregation-system side, the API server receives the request sent by the client device. In step 1412, the API server processes the received request, generating a set of internal server requests. In the for-loop of steps 1414, 1416, and 1418, for each request in the set, the API server transmits the request to an internal server for processing. Then in the loop of steps 1420, 1422, and 1424, the API server receives and processes responses returned by the internal servers. In step 1426, the API server processes the accumulated data returned by the internal servers in order to generate a response message. In the decision block 1428, the API server determines whether or not the accumulated data can fit in a single response message. When the accumulated data can fit in a single response message, control flows to step 1430, in which the API server returns the accumulated data in a response message with an indication that there is no further data to be returned. Otherwise, control flows to step 1432, in which the API server returns a portion of the accumulated data in a response message with an indication that there is more data available on the server, and in step 1434, stores the remaining data in a buffer, or stores one or more database cursors for subsequent retrieval of additional data from one or more databases. In step 1436, on the client side, the client device receives the response message returned from the API server. In step 1438, the client application program processes the received data and generates associated display events.

Figure 15A:
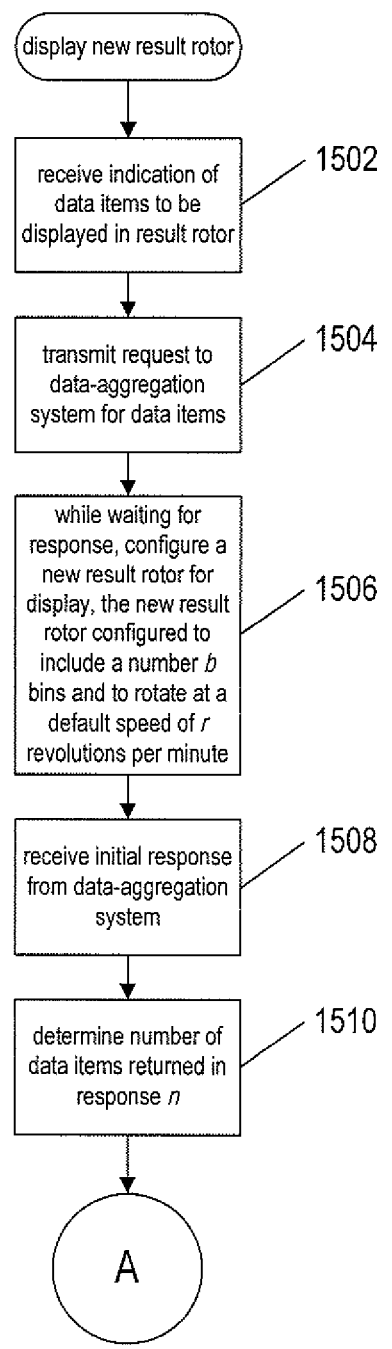
Figure 15B:
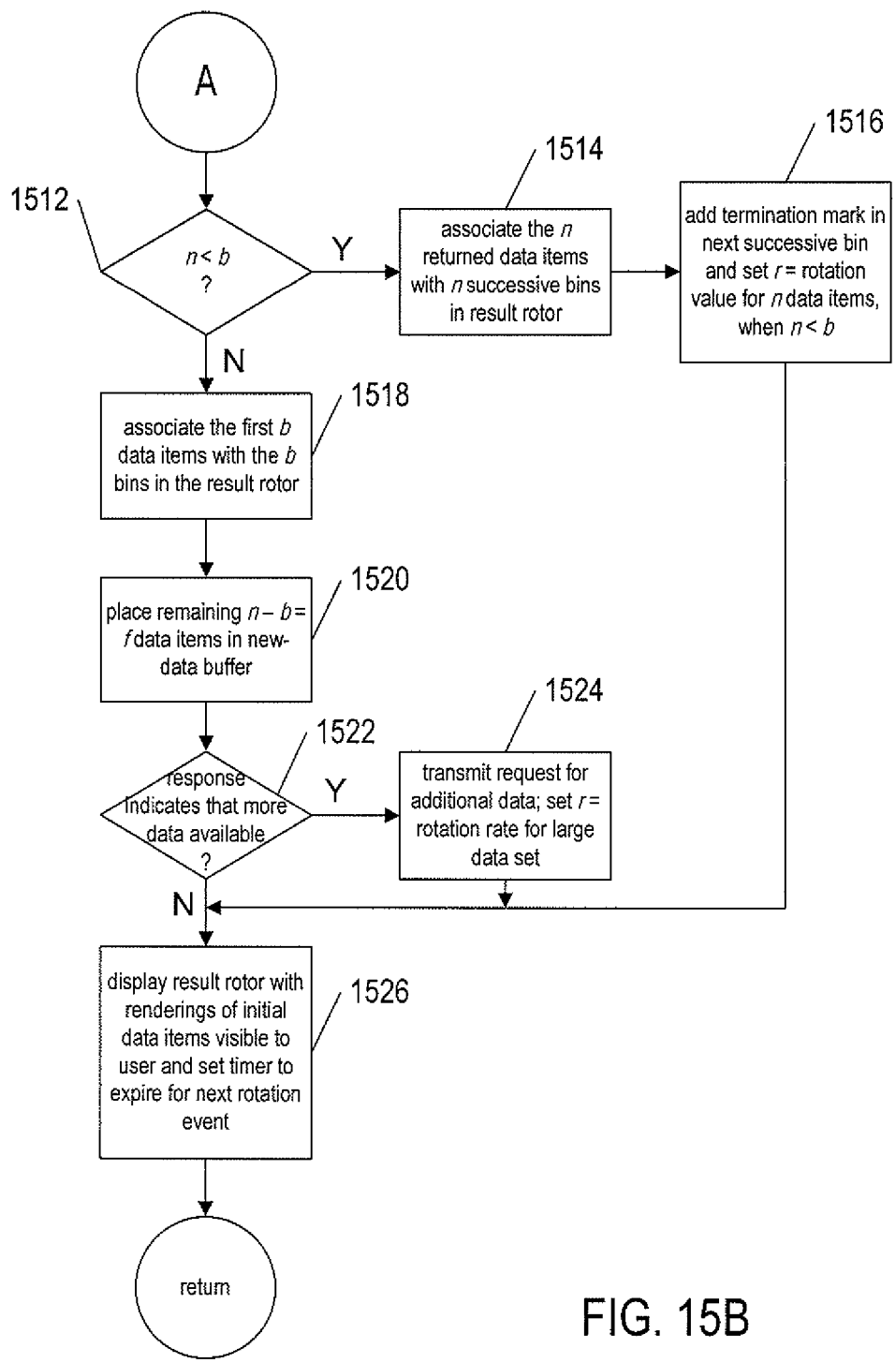

FIG. 15A-B provide a control-flow diagram that illustrates loading and displaying of new data items in a result rotor. In step 1502, the client application program receives an indication of data items to be displayed in a new result rotor. In step 1504, the client application program transmits a request to the data-aggregation system for retrieval of the data items. In step 1506, while waiting for the response from the data-aggregation system, the client application program configures a new result rotor for display. The new result rotor is configured to include a number of data bins b and to rotate at a default speed of r revolutions per minute. In step 1508, the client application program receives an initial response from the data-aggregation system. In step 1510, the client application program determines the number of data items, n, returned in the response. In the decision block 1512, the client application program determines whether or not the number n is smaller than number b. When the number n is smaller than number b, control flows to step 1514, in which the client application program associates the n returned data items with n successive bins in the result rotor. In step 1516, the client application program adds a termination mark in the next successive data bin and sets r to a rotational speed appropriate for the n data items. Control then flows to step 1526. When the number n is larger than b, control flows to step 1518, in which the client application program associates the first b data items with the b bins in the result rotor. In step 1520, the client application program places the remaining f data items, in which f=n−b, in a new data buffer. In the decision block 1522, the client application program determines whether or not the response returned from the API server indicates that more data items are available. When no more data items are available, control flows directly to step 1526, in which the client application program displays the result rotor with the renderings of the initial data items visible to the user and sets a rotor timer. Otherwise, when more data items are available, control flows to step 1524, in which the client device transmits a request for additional data and sets a rotational value r for the result rotor appropriate for a large data set. The rotational value r for the large data set may be different from the rotational speed appropriate for a small number of data items. Control then flows to step 1526 to display the result rotor with the renderings of initial data items.

Figure 16A:
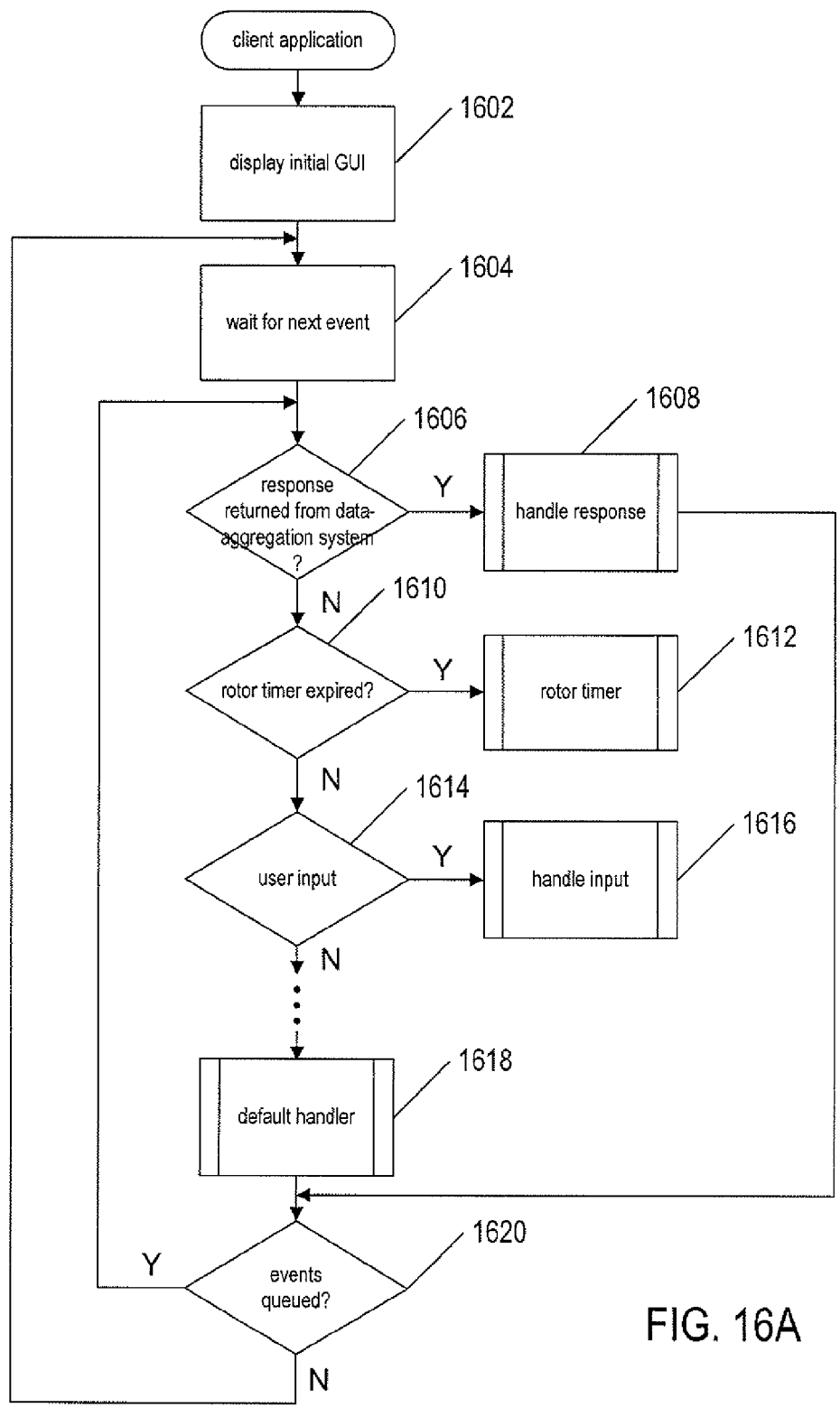
FIG. 16A illustrates a control-flow diagram for a client application.

FIG. 16A illustrates a control-flow diagram for a client application. In step 1602, the client application displays an initial GUI. In step 1604, the client application waits for a next event to take place. When a next event occurs, the client application program calls an appropriate event handler to handle the event. For example, when a response message is returned from the data-aggregation system as determined in step 1606, a response-message handler is called in step 1608. Other events include a rotor-timer expiration event, detected in step 1610, and user-input events detected in step 1614, which are handled by a rotor-timer event handler in step 1612 and an input event handler in step 1616, respectively. Many other types of events are generally detected and handled by the event loop shown in FIG. 16A. A default event handler 1618 is activated when no event handler has been found for an event type that occurs.

Figure 16B:
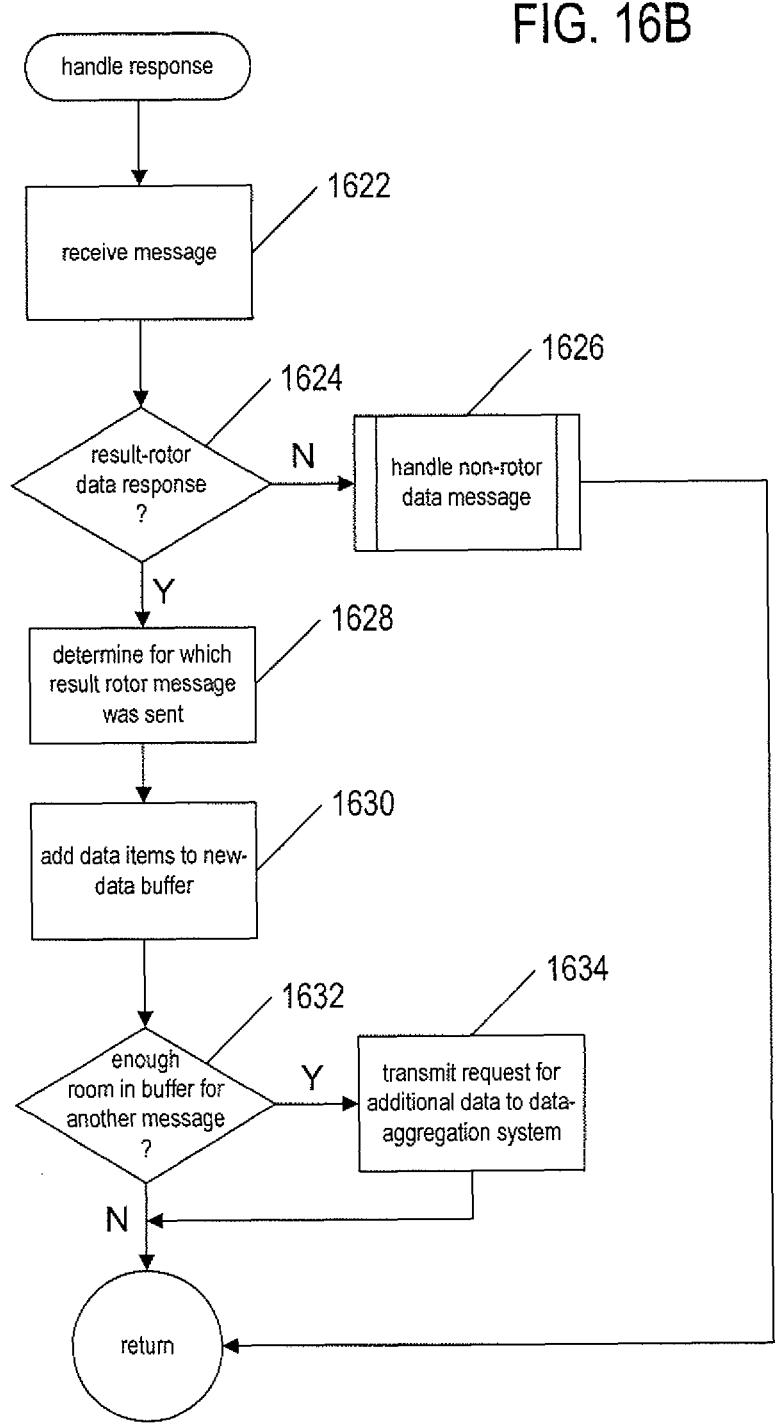
FIG. 16B illustrates an event handler for handling a response message returned from the data-aggregation system.

FIG. 16B illustrates an event handler 1608 for handling a response message returned from the data-aggregation system. In step 1622, the message is received by the event handler. In the decision block 1624, the client application program determines whether or not the received message contains data items for a result rotor. If not, another event handler is called in step 1626. Otherwise, control flows to 1628, in which the client application program determines for which result rotor the message was sent. In step 1630, the client application program adds data items in the response message to the new-data buffer. In the decision block 1632, the client application program determines whether or not there is enough room in the buffer for yet another set of data items. If so, control flows to step 1634, in which the client application program transmits a request for additional data to the data-aggregation system. Otherwise, event handler terminates.

Figure 16C:
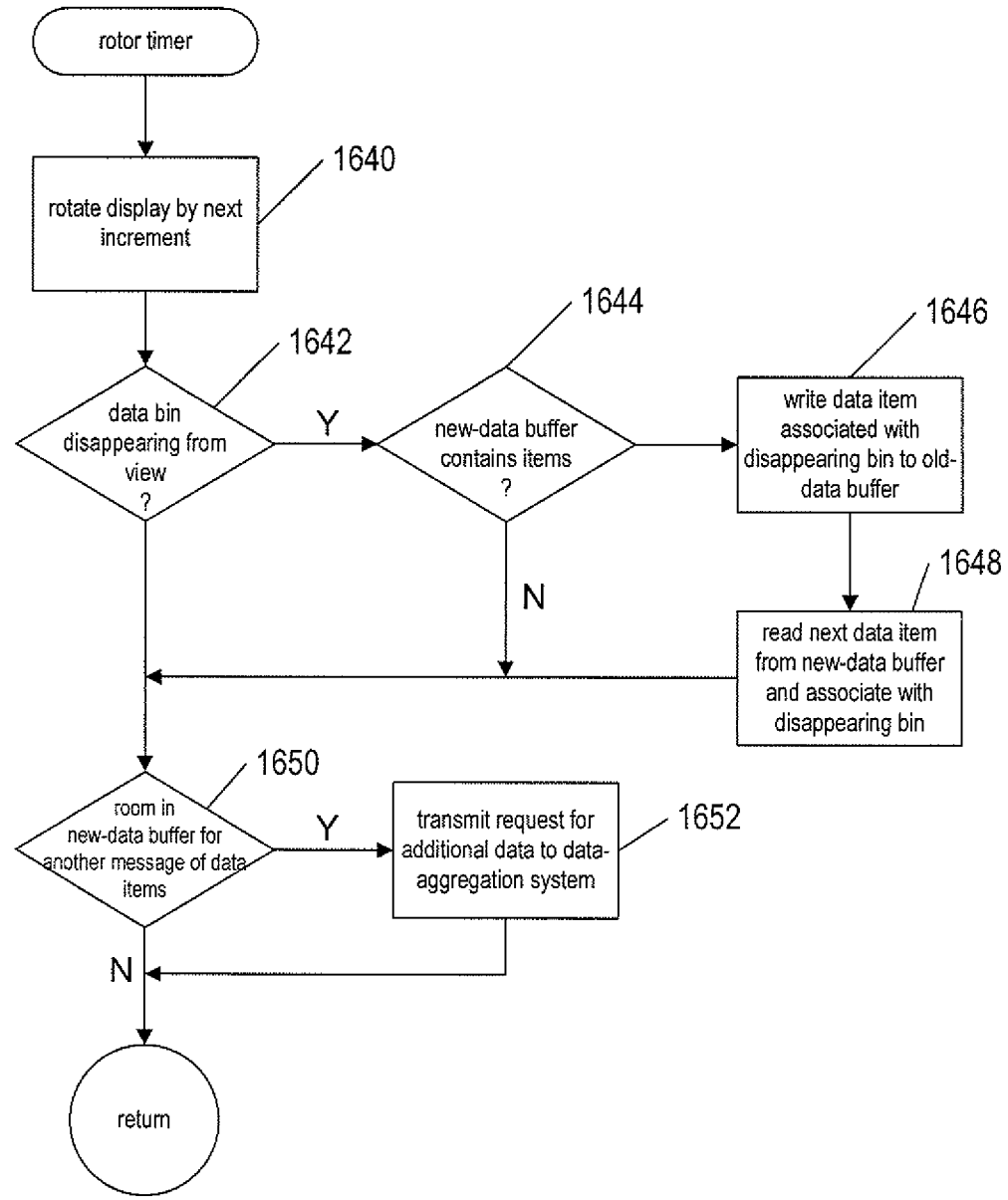
FIG. 16C illustrates a rotor-timer event handler.

FIG. 16C illustrates a rotor-timer event handler 1612. In step 1640, when the rotor time expires, the client application program rotates the carousel-display panel by a next rotational increment. In the decision block 1642, the client application program determines whether or not a data bin is now disappearing from the view. When no data bin is disappearing from the view, control flows to step 1650. Otherwise, control flows to decision block 1644, in which the client application program determines whether or not the new-data buffer contains data items. When the new-data buffer does not contain any data item, control flows to step 1650. Otherwise, control flows to step 1646, in which the client application program writes the data item associated with the disappearing data bin to an old-data buffer. In step 1648, the client application program then reads the next data item from the new-data buffer and associates the next data item with the disappearing data bin. In the decision block 1650, the client application program determines whether or not there is room in the new-data buffer for another set of data items and also confirms that there is no already-pending request for additional data items. When there is room in the new-data buffer for additional data items, control flows to step 1652, in which the client application program transmits a request for additional data items to the data-aggregation system. Otherwise, event handler terminates.

The client application maintains the new-data buffer and the old-data buffer, in certain implementations, in order to facilitate a change of direction in result-rotor rotation. In these implementations, data items are input to the result rotor from the new-data buffer when the result rotor spins in a forward direction and data items are input to the result rotor from the old-data buffer when the direction of the result-rotor spinning is reversed by user input. In certain implementations, the data-aggregation system can determine the total number of data items contained in the list of data items retrieved from the one or more data sources and return to the user device a first portion of data items from the top of the list, stored in the new-data buffer, and a second portion of data items from the bottom of the list, stored in the old-data buffer.

Although the present disclosure has been described in terms of particular implementations, it is not intended that the disclosure be limited to these implementations. Modifications within the spirit of the disclosure will be apparent to those skilled in the art. For example, various implementations disclosed in the document may be adapted for use with any computer based display, including personal computers, distributed computing systems, programmable consumer electronics, tablet displays, smart phone displays, and so on. Any of many different implementations of the data-aggregation system and data-carousel-based GUI can be obtained by varying any of many different design and implementation parameters, including programming language, underlying operating system, data structures, control structures, modular organization, and other such parameters. The underlying database may take different forms, and different types of database management systems may be employed to store data. As noted, there are many ways for an application to communicate with API. Subject matter described herein is not limited to the above request and response examples. The foregoing descriptions of specific implementations of the present disclosure are presented for purposes of illustration and description.

It is appreciated that the previous description of the disclosed implementations is provided to enable any person skilled in the art to make or use the present disclosure. Various modifications to these implementations will be readily apparent to those skilled in the art, and the generic principles defined herein may be applied to other implementations without departing from the spirit or scope of the disclosure. Thus, the present disclosure is not intended to be limited to the implementations shown herein but is to be accorded the widest scope consistent with the principles and novel features disclosed herein.

The invention claimed is:

1. A system for aggregating data obtained from remote data sources and presenting the aggregated data in a data-carousel-based graphical user interface, the system comprising:

a data-aggregation system that receives requests for data items from a user device, accesses one or more internal data servers to retrieve the requested data, and returns the requested data to the user device; and the user device having at least one processor, one or more memories, a network interface, an electronic display, and processor instructions, stored in one or more of the one or more memories that, when executed by the at least one processor, control the user device to request a list of one or more data items for display to a user from the data-aggregation system, the list of one or more data items having a first data item and a last data item, receive the list of requested data items in one or more response messages from the data-aggregation system, and present the list of data items in a data-carousel-based graphical user interface on the electronic display, the data-carousel-based graphical user interface containing a top-level rotor and one or more result rotors each comprising multiple data bins, each data bin representing a single data item, the one or more result rotors automatically rotating, without user input to initiate rotation, in order to continuously display the list of data items and the one or more result rotors rotating at a rotational speed that is based on one of a number of data items returned by the data-aggregation system, a number of data items in the list, a position of the result rotor within a set of displayed result rotors, previous user input, and current time with respect to a repeating time interval.

2. The system of claim 1, wherein the data-aggregation system comprises one or more servers selected from among:

API server;
media-content cluster;
recommendation-engine servers;
staging database cluster;
logging server; and
user profile database server.

3. The system of claim 1, wherein when the last data item in the list has been reached, the list is reset so that the first data item in the list is associated with a next available data bin and displayed in a result rotor.

4. The system of claim 1, wherein the data-carousel-based graphical user interface further comprises one or more sub-rotors, each sub-rotor displaying sub-categories for categories displayed in a higher-level sub-rotor or the top-level rotor.

5. The system of claim 1, wherein the one or more result rotors are concentrically stacked, with each result rotor automatically rotating at a particular rotational speed.

6. The system of claim 5, wherein the rotational speed is selected from one of:
multiple discrete rotational speeds; and
a continuous range of rotational speeds.

7. The system of claim 1, wherein a number of data items cumulatively displayed by a result rotor continuously increases, during display of data items by the result rotor, as additional date items are requested, by the user device, from the data-aggregation system and returned to the user device by the data-aggregation system.

8. The system of claim 1, wherein the data-carousel-based graphical user interface, in response to a user input, interrupts the automatic rotation of one of the one or more result rotors and rotates the result rotor at a different rotational speed.

9. A method for aggregating data obtained from remote data sources and presenting the aggregated data in a data-carousel-based graphical user interface, the method comprising:
providing a data-aggregation system that receives requests for data items from a user device, accesses one or more internal data servers to retrieve the requested data, and returns the requested data to the user device; and
controlling the user device having at least one processor, one or more memories, a network interface, an electronic display, and processor instructions, stored in one or more of the one or more memories that, when executed by the at least one processor, to
request a list of one or more data items for display to a user from the data-aggregation system, the list of one or more data items having a first data item and a last data item,
receive the list of requested data items in one or more response messages from the data-aggregation system, and
present the list of data items in a data-carousel-based graphical user interface on the electronic display, the data-carousel-based graphical user interface containing a top-level rotor and one or more result rotors each comprising multiple data bins, each data bin representing a single data item, the one or more result rotors automatically rotating, without user input to initiate rotation, in order to continuously display the list of data items and the one or more result rotors rotating at a rotational speed that is based on one of
a number of data items returned by the data-aggregation system,
a number of data items in the list,
a position of the result rotor within a set of displayed result rotors,
previous user input, and
current time with respect to a repeating time interval.

10. The method of claim 9, wherein the data-aggregation system comprises one or more servers selected from among:
API server;
media-content cluster;
recommendation-engine servers;
staging database cluster;
logging server; and
user profile database server.

11. The method of claim 9, wherein when the last data item in the list has been reached, the list is reset so that the first data item in the list is associated with a next available data bin and displayed in a result rotor.

12. The method of claim 9, wherein the data-carousel-based graphical user interface further comprises one or more sub-rotors, each sub-rotor displaying sub-categories for categories displayed in a higher-level sub-rotor or the top-level rotor.

13. The method of claim 9, wherein the one or more result rotors are concentrically stacked, with each result rotor automatically rotating at a particular rotational speed.

14. The method of claim 13, wherein the rotational speed is selected from one of:
multiple discrete rotational speeds; and
a continuous range of rotational speeds.

15. The method of claim 9, wherein a number of data items cumulatively displayed by a result rotor continuously increases, during display of data items by the result rotor, as additional data items are requested, by the user device, from the data-aggregation system and returned to the user device by the data-aggregation system.

16. The method of claim 9, wherein the data-carousel-based graphical user interface, in response to a user input, interrupts the automatic rotation of one of the one or more result rotors and rotates the result rotor at a different rotational speed.

17. A system for aggregating data obtained from remote data sources and presenting the aggregated data in a data-carousel-based graphical user interface, the system comprising:
a data-aggregation system that receives requests for data items from a user device, accesses one or more internal data servers to retrieve the requested data, and returns the requested data to the user device; and
the user device having at least one processor, one or more memories, a network interface, an electronic display, and processor instructions, stored in one or more of the one or more memories that, when executed by the at least one processor, control the user device to
request a list of one or more data items for display to a user from the data-aggregation system, the list of one or more data items having a first data item and a last data item,
receive the list of requested data items in one or more response messages from the data-aggregation system, and
present the list of data items in a data-carousel-based graphical user interface on the electronic display, the data-carousel-based graphical user interface containing a top-level rotor and one or more result rotors each comprising multiple data bins, each data bin representing a single data item, each data bin reused, after display of a data item associated with the data bin, to display an additional data item received from the data-aggregation system following initiation of presentation of the data items by the data-carousel-based graphical user interface, the one or more result rotors rotating at a rotational speed that is based on one of a number of data items returned by the data-aggregation system, a number of data items in the list, a position of the result rotor within a set of displayed result rotors, previous user input, and current time with respect to a repeating time interval.

18. The system of claim 17, wherein the data-carousel-based graphical user interface further comprises one or more sub-rotors, each sub-rotor displaying sub-categories for categories displayed in a higher-level sub-rotor or the top-level rotor.

* * * * *